US010969954B2

(12) United States Patent
Jaygarl et al.

(10) Patent No.: US 10,969,954 B2
(45) Date of Patent: Apr. 6, 2021

(54) ELECTRONIC DEVICE FOR PROCESSING USER INPUT AND METHOD FOR PROCESSING USER INPUT

(71) Applicant: Samsung Electronics Co., Ltd., Suwon-si (KR)

(72) Inventors: Ho Jun Jaygarl, Hwaseong-si (KR); Kyoung Gu Woo, Seoul (KR); Ga Jin Song, Anyang-si (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 15/903,618

(22) Filed: Feb. 23, 2018

(65) Prior Publication Data
US 2018/0253209 A1   Sep. 6, 2018

(30) Foreign Application Priority Data

Mar. 3, 2017   (KR) ........................ 10-2017-0027804

(51) Int. Cl.
| | |
|---|---|
| *G06F 3/048* | (2013.01) |
| *G06F 3/0488* | (2013.01) |
| *G06F 9/451* | (2018.01) |
| *G10L 15/22* | (2006.01) |
| *G06F 3/16* | (2006.01) |

(52) U.S. Cl.
CPC ............ *G06F 3/0488* (2013.01); *G06F 3/167* (2013.01); *G06F 9/451* (2018.02); *G10L 15/22* (2013.01)

(58) Field of Classification Search
None
See application file for complete search history.

(56) References Cited

U.S. PATENT DOCUMENTS

| | | | |
|---|---|---|---|
| 8,660,849 B2 | 2/2014 | Gruber et al. | |
| 8,670,979 B2 | 3/2014 | Gruber et al. | |
| 8,706,503 B2 | 4/2014 | Cheyer et al. | |
| 8,731,942 B2 | 5/2014 | Cheyer et al. | |

(Continued)

FOREIGN PATENT DOCUMENTS

| | | |
|---|---|---|
| EP | 2 835 798 A1 | 2/2015 |
| JP | 2007-256297 A | 10/2007 |

(Continued)

OTHER PUBLICATIONS

International Search Report dated May 30, 2018, issued in International Application No. PCT/KR2018/002275.

(Continued)

*Primary Examiner* — Hua Lu
(74) *Attorney, Agent, or Firm* — Jefferson IP Law, LLP

(57) ABSTRACT

An electronic device includes a housing, a touch screen display located inside the housing and exposed through a first portion of the housing, a microphone located inside the housing and exposed through a second portion of the housing, at least one speaker located inside the housing and exposed through a third portion of the housing, a communication circuit located inside the housing, a processor located inside the housing and electrically connected with the touch screen display, the microphone, the speaker, and the communication circuit, and a memory located inside the housing and electrically connected with the processor.

20 Claims, 15 Drawing Sheets

(56) References Cited

U.S. PATENT DOCUMENTS

| | | |
|---|---|---|
| 8,799,000 B2 | 8/2014 | Guzzoni et al. |
| 8,892,446 B2 | 11/2014 | Cheyer et al. |
| 8,903,716 B2 | 12/2014 | Chen et al. |
| 8,930,191 B2 | 1/2015 | Gruber et al. |
| 8,942,986 B2 | 1/2015 | Cheyer et al. |
| 9,117,447 B2 | 8/2015 | Gruber et al. |
| 9,318,108 B2 | 4/2016 | Gruber et al. |
| 9,380,001 B2* | 6/2016 | Bhattiprolu ............... G06F 8/36 |
| 9,454,964 B2 | 9/2016 | Jeon et al. |
| 9,548,050 B2 | 1/2017 | Gruber et al. |
| 9,966,073 B2* | 5/2018 | Gao ...................... G10L 15/26 |
| 2007/0036292 A1* | 2/2007 | Selbie ..................... H04L 51/04 |
| | | 379/88.14 |
| 2009/0327953 A1* | 12/2009 | Honkala ............. G06F 3/04886 |
| | | 715/804 |
| 2011/0195758 A1* | 8/2011 | Damale ............. H04M 1/72566 |
| | | 455/569.1 |
| 2011/0202924 A1* | 8/2011 | Banguero ............... G06F 9/485 |
| | | 718/103 |
| 2011/0223893 A1* | 9/2011 | Lau ........................ G10L 15/22 |
| | | 455/414.1 |
| 2012/0016678 A1* | 1/2012 | Gruber .................. B60K 35/00 |
| | | 704/275 |
| 2012/0022872 A1* | 1/2012 | Gruber ................... G06F 3/167 |
| | | 704/270.1 |
| 2012/0245944 A1 | 9/2012 | Gruber et al. |
| 2012/0259633 A1* | 10/2012 | Aihara ................. H04M 1/271 |
| | | 704/235 |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0117022 A1 | 5/2013 | Chen et al. |
| 2013/0185074 A1 | 7/2013 | Gruber et al. |
| 2013/0185081 A1 | 7/2013 | Cheyer et al. |
| 2013/0322634 A1* | 12/2013 | Bennett .................. G10L 21/00 |
| | | 381/17 |
| 2013/0346347 A1* | 12/2013 | Patterson ............... G06N 20/00 |
| | | 706/12 |
| 2014/0007007 A1* | 1/2014 | Lee ........................ G06F 9/451 |
| | | 715/810 |
| 2014/0040748 A1* | 2/2014 | Lemay ................ G10L 15/1822 |
| | | 715/728 |
| 2014/0095173 A1* | 4/2014 | Lynch ..................... G06F 3/167 |
| | | 704/275 |
| 2014/0109097 A1* | 4/2014 | Datla ....................... G06F 9/46 |
| | | 718/102 |
| 2014/0273979 A1* | 9/2014 | Van Os ............. H04M 3/53333 |
| | | 455/412.2 |
| 2014/0274203 A1* | 9/2014 | Ganong, III ...... H04W 52/0261 |
| | | 455/556.1 |
| 2014/0278416 A1* | 9/2014 | Schuster ................. G10L 15/32 |
| | | 704/246 |
| 2014/0365227 A1* | 12/2014 | Cash ....................... G10L 15/22 |
| | | 704/275 |
| 2015/0039307 A1* | 2/2015 | Jeon ........................ G10L 15/22 |
| | | 704/235 |
| 2015/0228279 A1* | 8/2015 | Biadsy ..................... G10L 15/26 |
| | | 704/235 |
| 2016/0065509 A1* | 3/2016 | Yang ................... G06F 3/04886 |
| | | 715/752 |
| 2016/0104486 A1* | 4/2016 | Penilla .................. G10L 15/005 |
| | | 704/232 |
| 2016/0155443 A1* | 6/2016 | Khan .................... G06F 1/3203 |
| | | 704/275 |
| 2016/0225371 A1* | 8/2016 | Agrawal ............... G06F 3/0488 |
| 2016/0260433 A1* | 9/2016 | Sumner ............... G06F 16/3344 |
| 2016/0328270 A1* | 11/2016 | Bikkula ................. G06F 3/038 |
| 2017/0026424 A1* | 1/2017 | Sandgren ............ H04L 65/1006 |
| 2017/0083179 A1* | 3/2017 | Gruber ............... G06Q 10/1097 |
| 2017/0083380 A1* | 3/2017 | Bishop .................. G06F 9/5083 |
| 2017/0084273 A1* | 3/2017 | Zohar ..................... G10L 13/02 |
| 2017/0098180 A1* | 4/2017 | Chandraghatgi ........................... |
| | | G06Q 10/06311 |
| 2017/0178626 A1 | 6/2017 | Gruber et al. |
| 2017/0185052 A1* | 6/2017 | Wang ................... G06Q 20/384 |
| 2017/0236330 A1* | 8/2017 | Seif ........................ G06F 3/0202 |
| | | 345/633 |
| 2018/0350353 A1* | 12/2018 | Gruber ................ G10L 15/1822 |
| 2019/0095050 A1* | 3/2019 | Gruber .................. G06F 3/0481 |

FOREIGN PATENT DOCUMENTS

| | | |
|---|---|---|
| KR | 10-2009-0040534 A | 4/2009 |
| KR | 10-2010-0092613 A | 8/2010 |
| KR | 10-2014-0001031 A | 1/2014 |

OTHER PUBLICATIONS

European Search Report dated Jul. 9, 2018, issued in European Application No. 18159669.3-1221.

* cited by examiner

ELECTRONIC DEVICE FOR PROCESSING USER INPUT AND METHOD FOR PROCESSING USER INPUT

CROSS-REFERENCE TO RELATED APPLICATION(S)

This application claims the benefit under 35 U.S.C. § 119(a) of a Korean patent application filed on Mar. 3, 2017 in the Korean Intellectual Property Office and assigned Serial number 10-2017-0027804, the entire disclosure of which is hereby incorporated by reference.

TECHNICAL FIELD

The present disclosure relates to an electronic device for processing a user input and a method for processing a user input.

BACKGROUND

Modern electronic devices may support a variety of input methods, such as speech input, in addition to conventional input methods using keyboards or mouses. For example, electronic devices, such as smartphones or tablet computers, may recognize a user's speech input and may execute actions or provide search results corresponding to the speech input while a speech recognition service is executed.

The speech recognition service may recognize a user input and may provide results for the user input to a user by using specific text included in the user input, or may determine the user's intent on the basis of natural language processing technology and may provide results appropriate for the determined intent to the user.

SUMMARY

Since the speech recognition service shows only a result according to a user input when recognizing and processing a user's speech, the speech recognition service may process only a simple user speech, such as executing a program, and may not provide processing results according to actions of a plurality of application programs for the user input.

The speech recognition service may not provide a result corresponding to a user input by sequentially executing apps and may also not provide a processing result according to actions of a plurality of application programs for the user input by controlling an organic operation of obtaining necessary information by executing another app to obtain information necessary for one running app.

Aspects of the present disclosure are to address at least the above-mentioned problems and/or disadvantages and to provide at least the advantages described below. Accordingly, an aspect of the present disclosure is to provide an electronic device, a method, and a server for processing a user input, in which a task corresponding to the user input is performed by a plurality of applications.

In accordance with an aspect of the present disclosure, an electronic device includes a housing, a touch screen display located inside the housing and exposed through a first portion of the housing, a microphone located inside the housing and exposed through a second portion of the housing, at least one speaker located inside the housing and exposed through a third portion of the housing, a communication circuit located inside the housing, a processor located inside the housing and electrically connected with the touch screen display, the microphone, the speaker, and the communication circuit, and a memory located inside the housing and electrically connected with the processor. The memory stores a first application program including a first user interface (UI) and a second application program including a second UI. When an instruction stored in the memory is executed, the processor performs the following operations: receiving a user input through at least one of the touch screen display and the microphone, in which the user input includes a request to perform a task by using the first application program and the second application program; transmitting data relating to the user input to an external server through the communication circuit; receiving a response from the external server through the communication circuit, in which the response includes information about a sequence of statuses of the electronic device for performing the task, the information includes a plurality of status IDs corresponding to the respective statuses, and the plurality of status IDs include a first status ID, a second status ID, a third status ID, and a fourth status ID that differ from one another; executing the first application program and displaying the first UI on the touch screen display on the basis of the first status ID after receiving the response; executing the second application program on the basis of the second status ID after displaying the first UI; displaying the second UI on the touch screen display on the basis of the third status ID and obtaining at least one parameter to be used in the first UI after executing the second application program; and displaying the first UI on the touch screen display on the basis of the fourth status ID and filling the first UI with the obtained at least one parameter after displaying the second UI.

In accordance with another aspect of the present disclosure, a control method of an electronic device includes receiving a user input including a request to perform a task by using a first application program and a second application program, through at least one of a touch screen display and a microphone, transmitting data relating to the user input to an external server through a communication circuit, receiving a response including information about a sequence of statuses of the electronic device for performing the task, from the external server through the communication circuit, executing the first application program and displaying a first UI on the touch screen display on the basis of a first status ID included in the information after receiving the response, executing the second application program on the basis of a second status ID included in the information after displaying the first UI, displaying a second UI of the second application program on the touch screen display on the basis of a third status ID included in the information and obtaining at least one parameter to be used in the first UI after executing the second application program, and displaying the first UI on the touch screen display on the basis of a fourth status ID included in the information and filling the first UI with the obtained at least one parameter after displaying the second UI.

In accordance with another aspect of the present disclosure, a server receives, from an external electronic device, data relating to a user input including a request to perform a task by using a first application program and a second application program, generates text data on the basis of the data relating to the user input, determines an intent of the user input and a parameter corresponding to the intent and necessary for performing the task, on the basis of the text data, generates a response including information about a sequence of statuses of the electronic device for performing the task, on the basis of the intent and the parameter, and transmits the response to the external electronic device.

In accordance with another aspect of the present disclosure, an electronic device includes a display, one or more microphones, a memory that stores a first application program including a first user interface (UI) and a second application program including a second UI, and a processor electrically connected with the display and the one or more microphones. When receiving, through at least one of the display and the microphones, a user input including a request to perform a task by using the first application program and the second application program, the processor executes the first application program, displays the first UI on the display, and executes the second application program after displaying the first UI.

In accordance with another aspect of the present disclosure, a control method of an electronic device includes receiving a user input including a request to perform a task by using a first application program and a second application program, through at least one of a display and a microphone, executing the first application program, displaying a first UI on the display, and executing the second application program after displaying the first UI.

According to various embodiments of the present disclosure, an electronic device, when executing apps according to a path rule, may obtain a parameter necessary for one running app by performing a nesting action (or a regression action) of executing another app to obtain a value. Accordingly, the electronic device may organizationally control the apps stored in the electronic device, thereby providing a user with various methods of providing a result corresponding to a user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
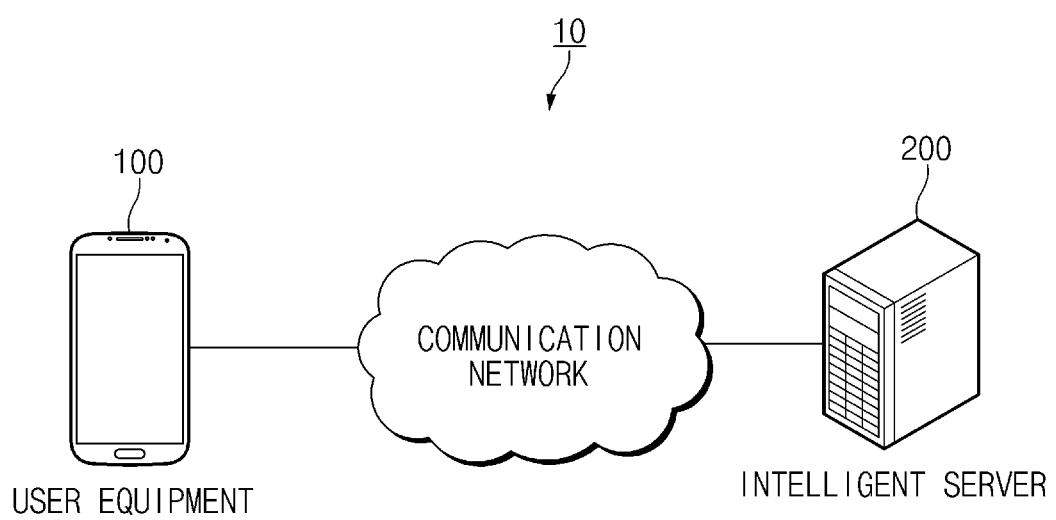
FIG. 1 illustrates an integrated intelligent system according to various embodiments of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of another embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an integrated intelligent system according to various embodiments of the present disclosure.

Referring to FIG. 1, an integrated intelligent system 10 may include user equipment (or an electronic device) 100 and an intelligent server 200.

The user equipment 100 may provide a necessary service to a user through apps (or application programs) (e.g., a message app, a contact app, and a gallery app) stored in the user equipment 100. For example, the user equipment 100 may receive a user input and may provide a necessary service to the user by executing the apps stored in the user equipment 100. The user input may be received through, for example, a physical button, a touch pad, a microphone, or the like. According to an embodiment, the user equipment 100 may include various types of terminal devices (or electronic devices), such as a mobile phone, a smartphone, a personal digital assistant (PDA), a notebook computer, and the like, which are connectable to the Internet.

According to an embodiment, the user equipment 100 may receive a user input to operate the apps stored in the user equipment 100. For example, the user equipment 100 may receive user speech as a user input and may operate the apps stored in the user equipment 100 on the basis of the received user speech. For example, the user equipment 100 may recognize the received user speech through the intelligent server 200 and may generate execution request information on the basis of the recognized user speech. The user equipment 100 may operate an app by using the execution request information.

The intelligent server 200 may receive a user voice input from the user equipment 100 through a communication network and may change the received user voice input to text data. According to an embodiment, the intelligent server 200 may generate (or determine) a path rule on the basis of the text data. The path rule may include information about actions for performing a task by using apps and information about parameters necessary for executing the actions. For example, the path rule may include information about a plurality of actions to be sequentially executed and information about parameters necessary for executing the plurality of actions. The user equipment 100 may receive the path rule from the intelligent server 200 and may select applications depending on the path rule to execute the actions included in the path rule.

According to an embodiment, the integrated intelligent system 10 may further include a personalization information server (not illustrated) in which user information is included. For example, the personalization information server may receive user information (e.g., app execution information) from the user equipment 100 and may store the received user information in a database. The user information stored in the database may be used to generate a path rule.

Figure 2:
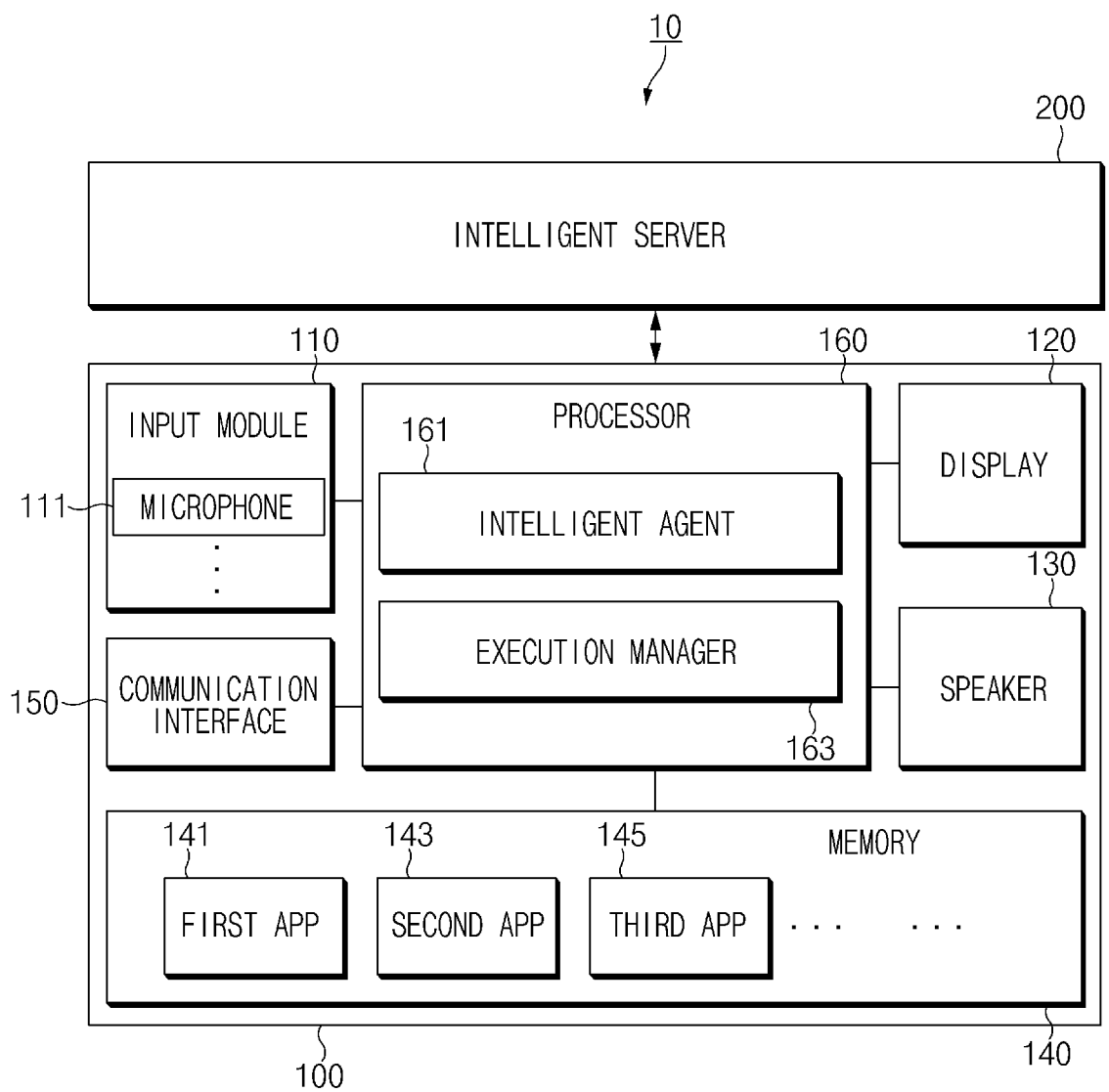
FIG. 2 is a block diagram illustrating a configuration of user equipment of an integrated intelligent system, according to an embodiment of the present disclosure.

FIG. 2 is a block diagram illustrating a configuration of user equipment of an integrated intelligent system, according to an embodiment of the present disclosure.

Referring to FIG. 2, the user equipment 100 of the integrated intelligent system 10 may include an input module 110, a display 120, a speaker 130, a memory 140, a communication interface 150, or a processor 160. The user equipment 100 may further include a housing, and the components of the user equipment 100 may be located inside the housing.

The input module 110 may receive a user input from a user. For example, the input module 110 may receive a user input from a connected external device (e.g., a keyboard or a headset). In another example, the input module 110 may receive a user input through a touch screen (e.g., a touch screen display) combined with the display 120. In another example, the input module 110 may receive a user input through a hardware key (or a physical key) located on the user equipment 100 (or the housing of the user equipment 100). The user input may include, for example, a request to perform a task by using a plurality of apps stored in the memory 140.

According to an embodiment, the input module 110 may include a microphone 111 for receiving user speech as a voice signal. For example, the input module 110 may include a speech input system and may receive user speech through the speech input system as a voice signal. According to an embodiment, the input module 110 may be exposed through a portion of the housing of the user equipment 100. For example, the microphone 111 included in the input module 110 may be exposed through a portion (or a first portion) of the housing.

The display 120 may display an image, a video, and/or an execution screen of an application. For example, the display 120 may display a user interface (UI) (or a graphic user interface (GUI)) of an app. According to an embodiment, the display 120 may be a touch screen display combined with a touch screen. According to an embodiment, the display 120 may be exposed through a portion of the housing of the user equipment 100. For example, the display 120 combined with the touch screen may be exposed through a portion (or a second portion) of the housing.

The speaker 130 may output a voice signal. For example, the speaker 130 may output a voice signal generated in the user equipment 100 to the outside. According to an embodiment, the speaker 130 may be exposed through a portion (or a third portion) of the housing of the user equipment 100.

The memory 140 may store a plurality of apps 141, 143, and 145. The plurality of apps 141, 143, and 145 stored in the memory 140 may be executed according to a user input. For example, the memory 140 may include a non-volatile memory (e.g., a flash memory, a hard disk, or the like) and a volatile memory (e.g., a random access memory (RAM)), and the plurality of apps 141, 143, and 145 stored in the non-volatile memory may be loaded into (or bound to) the volatile memory to operate.

According to an embodiment, the memory 140 may store information necessary for recognizing a user input. For example, the memory 140 may store log information and user information. The log information and the user information stored in the memory 140 may be transmitted to a personalization information server and may be stored in a database. The user information stored in the database of the personalization information server may be used by the intelligent server 200 to generate a path rule.

The communication interface (or communication circuit) 150 may be connected with an external electronic device to transmit and receive signals (or data). For example, the communication interface 150 may include a wireless communication interface (e.g., Bluetooth, Wi-Fi, or the like). The wireless communication interface may be connected with the intelligent server 200 to transmit and receive signals (e.g., a user input and a path rule corresponding to the user input).

The processor 160 may control an overall operation of the user equipment 100. For example, the processor 160 may be electrically connected with the input module 110, the display 120, the speaker 130, the memory 140, and the communication interface 150. The processor 160 may control the input module 110, the display 120, the speaker 130, the memory 140, and the communication interface 150 to receive a path rule corresponding to a user input from the intelligent server 200 and to sequentially execute actions included in the path rule in applications. According to an embodiment, the processor 160 may execute instructions stored in the memory 140 to control an overall operation of the user equipment 100.

According to an embodiment, the processor 160 may drive an intelligent agent 161 and an execution manager 163 by executing instructions stored in the memory 140. According to another embodiment, the processor 160 may include the intelligent agent 161 and the execution manager 163 implemented with hardware. For example, the processor 160 may include a plurality of processors that perform at least one function. The intelligent agent 161 and the execution manager 163 may be implemented with, for example, respective processors.

The intelligent agent 161 may transmit a user input received through the input module 110 to the intelligent server 200. For example, the intelligent agent 161 may transmit data relating to the received user input to the intelligent server 200 through the communication interface 150. The user input may include, for example, a request to perform a task by using the plurality of apps 141, 143, and 145 stored in the memory 140. According to an embodiment, the intelligent agent 161 may perform a pre-processing operation on the user input before transmitting the user input to the intelligent server 200. For example, the intelligent agent 161 may pre-process the user input by using at least one of an adaptive echo canceller (AEC), a noise suppression (NS) module, end-point detection (EPD), and automatic gain control (AGC).

According to an embodiment, the intelligent agent 161 may request the user to enter information that needs to be input. For example, in the case where actions of the apps 141, 143, and 145 stop operating (partial landing) (e.g., in the case where parameters necessary for the actions of the apps 141, 143, and 145 are not input), the intelligent agent 161 may receive information about the suspended state from the execution manager 163 and may request the user to enter necessary information, by using the received information.

According to an embodiment, the intelligent agent 161 may transmit information of the user equipment 100 to the intelligent server 200. For example, the intelligent agent 161 may transmit at least one of operating system (OS) information and app information of the user equipment 100 to the intelligent server 200.

According to an embodiment, the intelligent agent 161 may receive a path rule from the intelligent server 200 and may forward (or provide) the received path rule to the execution manager 163. For example, the intelligent agent 161 may receive a path rule (or a response) corresponding to the request included in the user input through the communication interface 150.

According to an embodiment, the intelligent agent 161 may receive a user voice input converted into text data from the intelligent server 200. The intelligent agent 161 may display the converted text data on the display 120.

According to an embodiment, the execution manager 163 may send execution request information for executing an action included in the path rule to the app 141, 143, or 145. For example, the execution manager 163, if receiving the path rule, may execute the app 141, 143, or 145 according to the path rule and may send execution request information included in the path rule to the app 141, 143, or 145. The execution request information may include, for example, a status ID (e.g., a status ID (MessageComposer) for composing a message, a status ID (ContactPicker) for selecting a contact number, or a status ID (ImagePicker" for selecting an image) and a parameter (e.g., a message "I'm a little late.", a contact number of "mother", or an image of "Hawaii") necessary for the status ID. The execution manager 163 may sequentially send execution request information included in the path rule to the apps 141, 143, and 145 to operate the apps 141, 143, and 145 according to the path rule.

According to an embodiment, the execution manager 163 may manage execution states of actions of the apps 141, 143, and 145. The execution manager 163 may receive information about an execution state of an action from the app 141, 143, or 145. For example, in the case where the action is completely executed, the execution manager 163 may receive information about the execution-completed state from the corresponding app. The execution manager 163 may send the next execution request information to the corresponding app according to the path rule. In another example, in the case where the action stops operating (partial landing) (e.g., in the case where a parameter necessary for the action of the corresponding app is not input), the execution manager 163 may receive information about the suspended state from the app in which the action stops operating. The execution manager 163 may forward the information about the suspended state to the intelligent agent 161.

According to an embodiment, the execution manager 163 may receive a plurality of path rules from the intelligent server 200. For example, the intelligent server 200 may specify some actions as actions 141*b* of the first app 141 (e.g., a gallery app) that will be executed on the basis of user speech, but may not specify the remaining actions as actions 143*b* of the second app 143 (e.g., a message app or an e-mail app). Accordingly, the intelligent server 200 may transmit, to the user equipment 100, a plurality of path rules specified by the actions 141*b* of the first app 141. According to an embodiment, the execution manager 163 may execute a part common to the plurality of received path rules. For example, the execution manager 163 may execute the actions 141*b* of the first app 141 and then may display, on the display 120, a screen for selecting different apps included in the plurality of path rules. The user may select one of the different apps displayed on the display 120. Accordingly, the execution manager 163 may execute the remaining actions corresponding to the user input.

Figure 3:
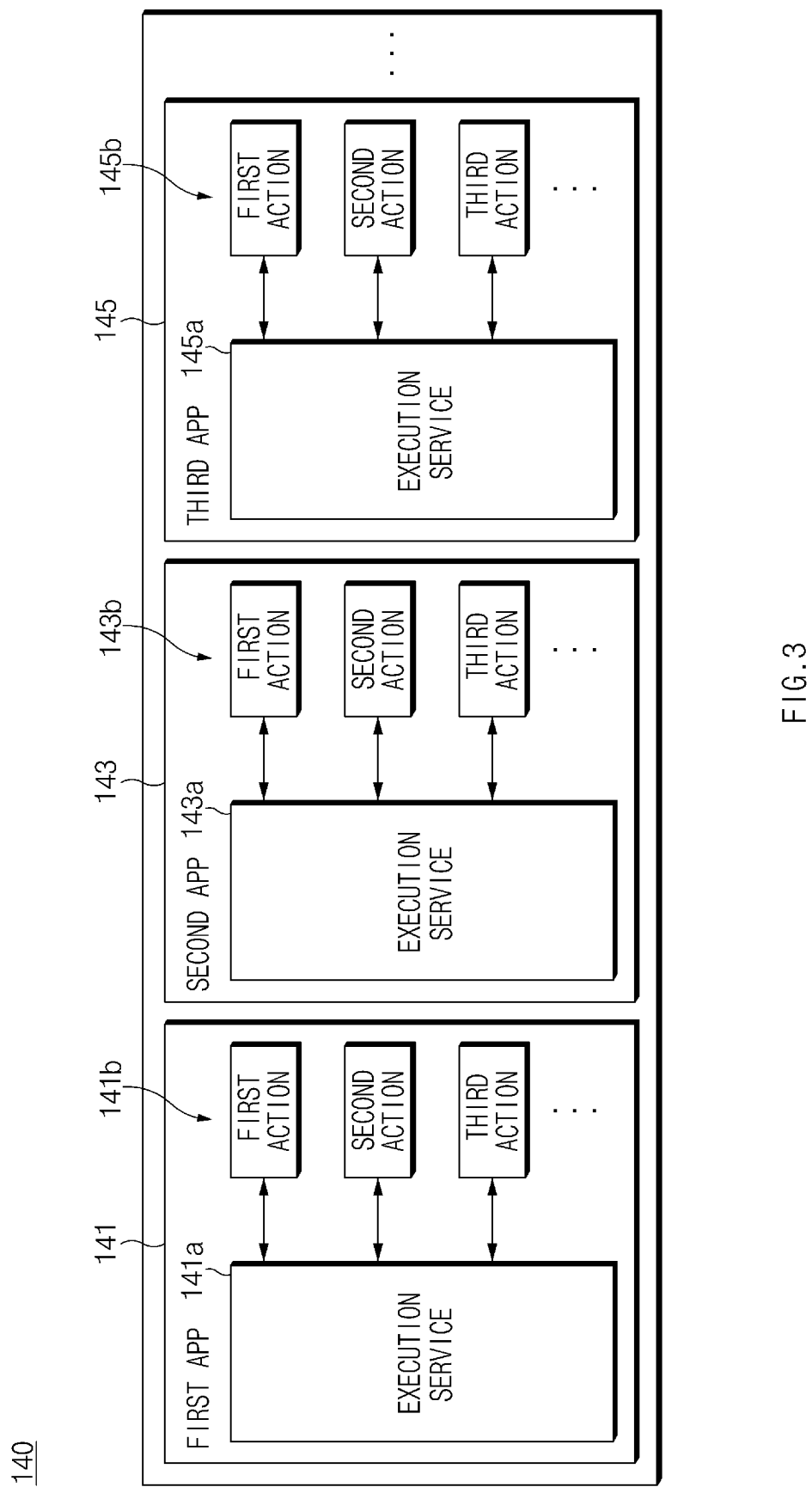
FIG. 3 is a block diagram illustrating execution of apps stored in a memory of user equipment, according to an embodiment of the present disclosure.

FIG. 3 is a block diagram illustrating execution of apps stored in a memory of user equipment, according to an embodiment of the present disclosure.

Referring to FIG. 3, the memory 140 may store the plurality of apps 141, 143, and 145. For example, the memory 140 may include the first app 141, the second app 143, and the third app 145. The first app 141, the second app 143, and the third app 145 may provide (or include), for example, a first UI, a second UI, and a third UI, respectively.

According to an embodiment, the plurality of apps 141, 143, and 145 stored in the memory 140 may be executed and operated by the execution manager 163 of the processor 160. The plurality of apps 141, 143, and 145 may include execution services 141*a*, 143*a*, and 145*a* for performing a task and a plurality of actions (or unit actions) 141*b*, 143*b*, and 145*b*. The execution services 141*a*, 143*a*, and 145*a* may be generated by the execution manager 163 of the processor 160 to execute the plurality of actions 141*b*, 143*b*, and 145*b*. According to an embodiment, the execution services 141*a*, 143*a*, and 145*a* of the apps 141, 143, and 145 may be implemented with a program language.

According to an embodiment, when the actions 141*b*, 143*b*, and 145*b* of the apps 141, 143, and 145 are executed, screens according to the execution of the actions 141*b*, 143*b*, and 145*b* may be displayed on the display 120. For example, UIs corresponding to the actions 141*b*, 143*b*, and 145*b* of the apps 141, 143, and 145 may be displayed on the display 120. The screens displayed on the display 120 may be, for example, screens in the state in which the actions 141*b*, 143*b*, and 145*b* are completely executed.

The execution services 141*a*, 143*a*, and 145*a* may execute the actions 141*b*, 143*b*, and 145*b* according to a path rule. For example, the execution services 141*a*, 143*a*, and 145*a* may receive execution request information (e.g., a status ID and a parameter) from the execution manager 163 according to the path rule and may execute the actions 141*b*, 143*b*, and 145*b* according to the execution request information. If the actions 141*b*, 143*b*, and 145*b* are completely executed, the execution services 141*a*, 143*a*, and 145*a* may send execution completion information to the execution manager 163.

According to an embodiment, the plurality of actions 141*b*, 143*b*, and 145*b* may be sequentially executed in the apps 141, 143, and 145. If one action is completely executed, the execution services 141*a*, 143*a*, and 145*a* may send execution completion information to the execution manager 163. The execution manager 163, if receiving the execution completion information, may send execution request information for the next actions 141*b*, 143*b*, and 145*b* to the apps 141, 143, and 145.

According to an embodiment, in the case where the plurality of apps 141, 143, and 145 are executed, the plurality of apps 141, 143, and 145 may be sequentially executed. For example, if receiving execution completion information after the last action of the first app 141 is completely executed, the execution manager 163 may send execution request information for the first action of the second app 143 to the execution service 143*a*. According to an embodiment, when the actions 141*b*, 143*b*, and 145*b* of the apps 141, 143, and 145 are executed, the screens according to the execution of the actions 141*b*, 143*b*, and 145*b* may be displayed on the display 120.

Figure 4:
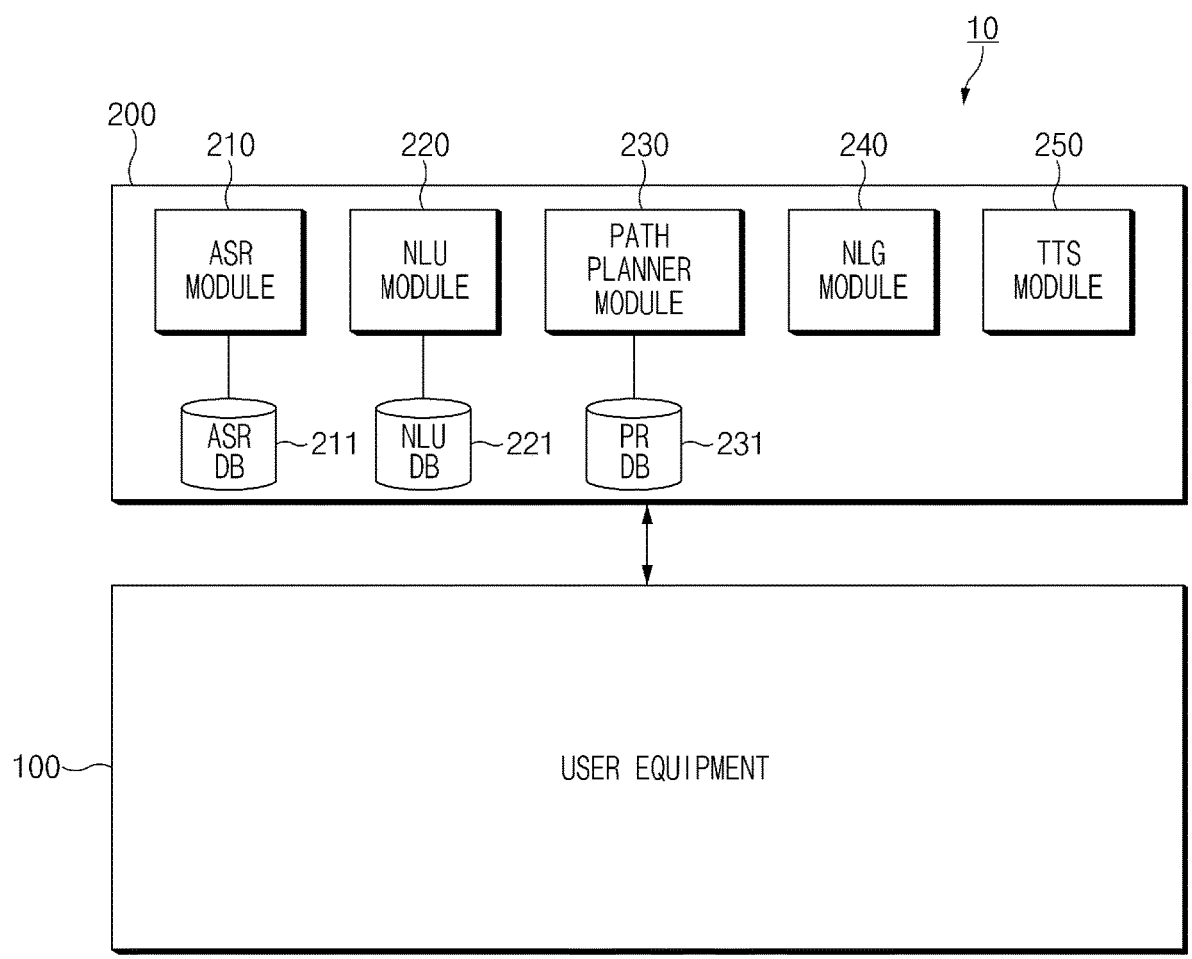
FIG. 4 is a block diagram illustrating a configuration of an intelligent server of an integrated intelligent system, according to an embodiment of the present disclosure.

FIG. 4 is a block diagram illustrating a configuration of an intelligent server of an integrated intelligent system, according to an embodiment of the present disclosure.

Referring to FIG. 4, the intelligent server 200 may include an automatic speech recognition (ASR) module 210, a natural language understanding (NLU) module 220, a path planner module 230, a natural language generator (NLG) module 240, and a text-to-speech (TTS) module 250.

According to an embodiment, the intelligent server 200 may generate a path rule corresponding to a user input through the automatic speech recognition module 210, the natural language understanding module 220, and the path planner module 230.

According to an embodiment, the automatic speech recognition (ASR) module 210 may convert a user input received from the user equipment 100 into text data. For example, the automatic speech recognition module 210 may include a speech recognition module. The speech recognition module may include an acoustic model and a language model. For example, the acoustic model may include information relating to vocalization, and the language model may include unit phoneme information and information about a combination of the unit phoneme information. The speech recognition module may convert user speech into text data by using the information relating to vocalization and the information about the combination of the unit phoneme information. Information about the acoustic model and the language model may be stored in, for example, an automatic speech recognition database (ASR DB) 211.

According to an embodiment, the intelligent server 200 may further include a speaker recognition module. The speaker recognition module may recognize a speaker by analyzing user speech on the basis of a speaker recognition model stored in a database. The speaker recognition module may generate a user's speaker recognition model on the basis of speech input by the user for the first time and may store the generated speaker recognition model in the database. According to an embodiment, the speaker recognition module may determine whether a user input corresponds to a registered speaker input, based on the speaker recognition model. For example, in the case where it is determined that the user input corresponds to the registered speaker input, the intelligent server 200 may generate a path rule for performing all tasks corresponding to the user input. In another example, in the case where it is determined that the user input corresponds to an unregistered speaker input, the intelligent server 200 may generate a path rule for performing only a limited task corresponding to the user input.

According to an embodiment, the natural language understanding module 220 may determine a user's intent and parameters by using a matching rule that is divided into a domain, an intent, and parameters (or slots) necessary for determining the intent. For example, the domain (e.g., alarm) may include a plurality of intents (e.g., setting alarm, cancelling alarm, and the like), and one intent may include a plurality of parameters (e.g., time, the number of repetitions, an alarm sound, and the like). A plurality of rules may include, for example, one or more essential element parameters. The matching rule may be stored in a natural language understanding database (NLU DB) 221.

According to an embodiment, the natural language understanding module 220 may understand the meanings of words extracted from a user input by using linguistic features (e.g., grammatical elements), such as morphemes, phrases, and the like, and may match the understood meanings of the words to domains and intents to determine a user's intent. For example, the natural language understanding module 220 may determine the user's intent by computing how many of the extracted words are included in each domain and intent. According to an embodiment, the natural language understanding module 220 may determine parameters of the user input by using the words on the basis of which the intent is determined. According to an embodiment, the natural language understanding module 220 may determine the user's intent by using the natural language understanding (NLU) database 221 in which the linguistic features for determining the intent of the user input are stored.

According to an embodiment, the natural language understanding module 220 may generate a path rule on the basis of the intent and parameters of the user input. For example, based on the intent of the user input, the natural language understanding module 220 may select apps to be executed and may determine actions corresponding to tasks to be performed in the selected apps. The natural language understanding model 220 may determine parameters corresponding to the determined actions to generate the path rule. According to an embodiment, the natural language understanding module 220 may generate one or more path rules corresponding to the intent and parameters of the user input.

According to an embodiment, the path rule generated by the natural language understanding module 220 may include apps to be executed, actions to be executed in each app, and parameters necessary for executing the actions. Furthermore, the path rule may include information about the sequence of the actions to be executed in the app. For example, the path rule may include information about statuses of the user equipment 100 when the actions of the app are executed. The information about the statuses of the user equipment 100 may include, for example, status IDs corresponding to the statuses of the user equipment 100 (e.g., a status ID (e.g., MessageComposer) for composing a message, a status ID (e.g., ContactPicker) for selecting a contact number, and a status ID (e.g., ImagePicker) for selecting an image). The parameters may correspond to the status IDs. The status IDs may each include at least a portion of the name of an app for executing an action corresponding to the status ID (e.g., MessageComposer of a message app, ContactPicker of a contact app, or ImagePicker of an image an (or a gallery app)).

According to an embodiment, the natural language understanding module 220 may generate one or more path rules by mapping the intent and parameters of the user input onto a rule set including a plurality of path rules. For example, the natural language understanding module 220 may receive a rule set corresponding to the user equipment 100 from the path planner module 230 and may map the intent and parameters of the user input onto the received rule set to determine a path rule.

According to another embodiment, the natural language understanding module 220 may generate one or more path rules by determining apps to be executed, actions to be executed in each app, and parameters necessary for executing the actions, on the basis of the intent and parameters of the user input. For example, the natural language understanding module 220 may generate a path rule by arranging the apps to be executed and the actions to be executed in the apps, in an ontology or graph model form depending on the intent of the user input by using information of the user equipment 100. The generated path rule may be stored in, for example, a path rule database (PR DB) 231 through the path planner module 230. The generated path rule may be added to a rule set of the path rule database 231.

According to an embodiment, the natural language understanding module 220 may select at least one path rule, which is to be transmitted to the user equipment 100, from the plurality of generated path rules. For example, the natural language understanding module 220 may select an optimal path rule from the plurality of path rules. In another example, the natural language understanding module 220 may select a plurality of path rules in the case where only some actions are specified based on user speech. The natural language understanding module 220 may determine one path rule of the plurality of path rules in response to an additional user input.

According to an embodiment, the natural language understanding module 220 may transmit a path rule to the user equipment 100. For example, the natural language understanding module 220 may transmit one path rule corresponding to a user input to the user equipment 100. In another example, the natural language understanding module 220 may transmit a plurality of path rules corresponding to a user input to the user equipment 100. The plurality of path rules may be generated by the natural language understanding module 220 in the case where only some actions are specified based on user speech.

According to an embodiment, the path planner module 230 may send a rule set including a plurality of path rules to the natural language understanding module 220. The plurality of path rules in the rule set may be stored in a table form in the path rule data base 231 connected to the path planner module 230. For example, the path planner module 230 may receive information (e.g., OS information and app information) of the user equipment 100 from the intelligent agent 161 and may send a rule set corresponding to the received information of the user equipment 100 to the natural language understanding module 220.

According to an embodiment, the path planner module 230 may store, in the path rule database 231, a path rule generated by the natural language understanding module 220. The generated path rule may be added to the rule set stored in the path rule database 231.

According to an embodiment, the natural language generator (NLG) module 240 may change specified information in a text form. The text form may be a natural language speech form. The specified information may be, for example, information for an additional input, information for notifying of completion of an action, or the like.

According to an embodiment, the text-to-speech module 250 may change information of a text form to information of a speech form. The text-to-speech module 250 may receive information of a text form from the natural language generator module 240, may change the information of a text form to information of a speech form, and may transmit the information of a speech form to the user equipment 100.

According to another embodiment, the natural language understanding module 220 may send the user's intent and the parameters to the path planner module 230. For example, the path planner module 230 may generate one or more path rules by matching the user's intent and the parameters to a rule set. The path planner module 230 may generate a path rule by using the rule set stored in the path rule database 231. In another example, the path planner module 230 may generate one or more path rules by determining apps to be executed and actions to be executed in the apps, on the basis of the user's intent and the parameters. The path planner module 230 may store the generated path rule(s) in the path rule database 231. The path planner module 230 may transmit the generated path rule(s) to the user equipment 100.

According to another embodiment, the natural language understanding module 220 and the path planner module 230 may be implemented with a single module. For example, the natural language module 220 and the path planner module 230 may be implemented with a single module to determine a user's intent and parameters and to generate one or more path rules corresponding to the user's intent and the parameters. Accordingly, the generated path rule(s) may be transmitted to the user equipment 100.

Figure 5:
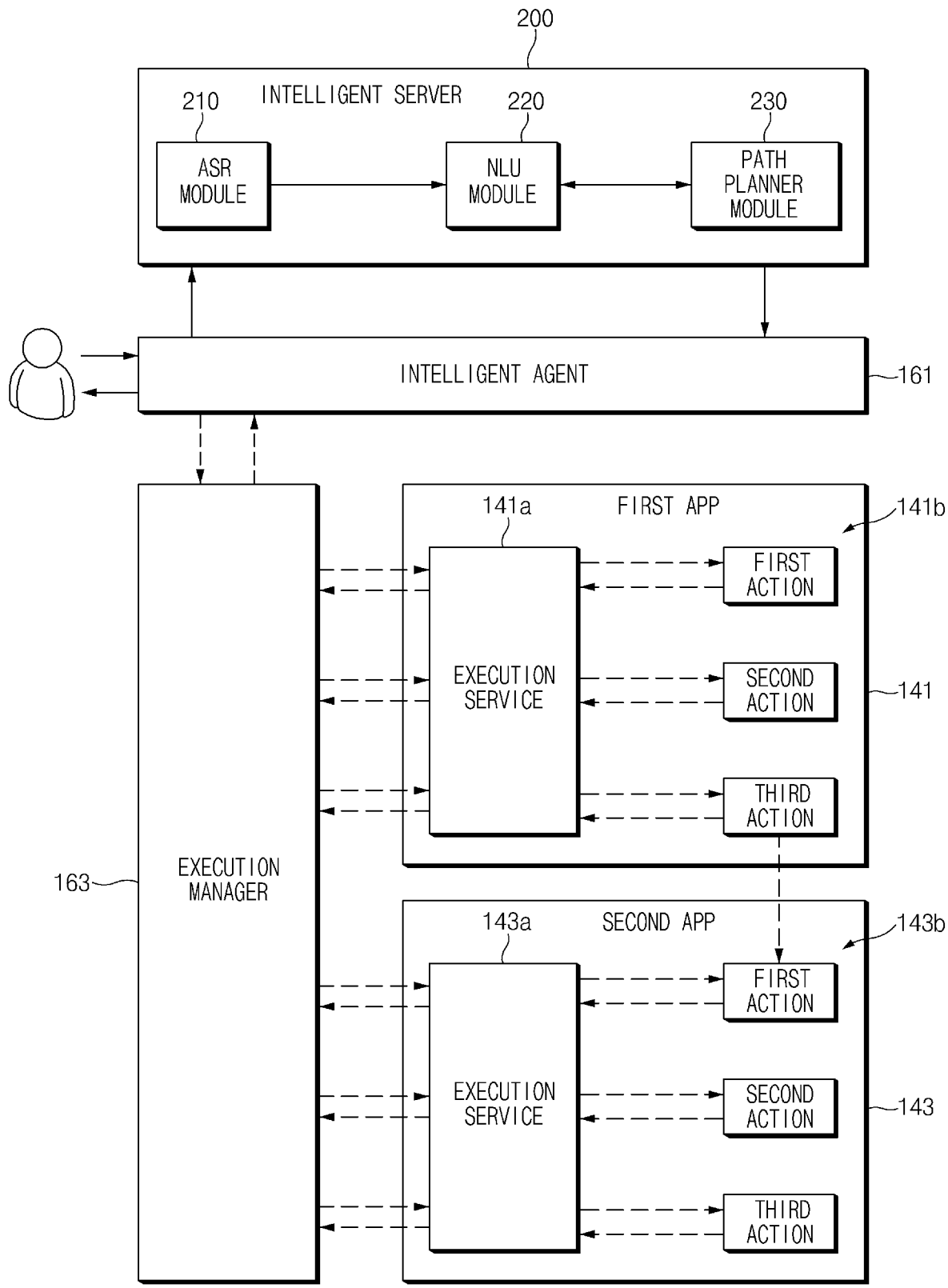
FIG. 5 illustrates a case where a plurality of apps are executed in user equipment, according to an embodiment of the present disclosure.

FIG. 5 illustrates a case where a plurality of apps are executed in user equipment, according to an embodiment of the present disclosure.

Referring to FIG. 5, the user equipment 100 may receive a user input and may execute the first app 141 and the second app 143 by receiving a path rule corresponding to the user input through the intelligent server 200.

According to an embodiment, the intelligent agent 161 of the user equipment 100 may receive and transmit the user input to the intelligent server 200. For example, the intelligent agent 161 may receive a voice signal as a user input and may transmit the received voice signal to the intelligent server 200.

According to an embodiment, the intelligent server 200 may determine a path rule corresponding to the user input. For example, the intelligent server 200 may generate the path rule on the basis of the intent of the user input and parameters necessary for determining the intent. The generated path rule may be, for example, a path rule for executing three actions 141*b* of the first app 141 and three actions 143*b* of the second app 143. According to an embodiment, the intelligent server 200 may transmit the determined path rule to the user equipment 100.

According to an embodiment, the intelligent agent 161 of the user equipment 100 may receive the path rule and may generate instructions to execute the apps on the basis of the path rule. For example, the intelligent agent 161 may send the path rule to the execution manager 163. The execution manager 163 may select the apps 141 and 143 on the basis of the path rule and may execute the selected apps 141 and 143. The execution manager 163 may send execution request information (e.g., a status ID and a parameter) for executing the first action to the execution service 141*a* of the first app 141. The execution manager 141*a* may execute the first action and may send execution completion information to the execution manager 163 if the first action is completely executed. The execution manager 163, if receiving the execution completion information, may send execution request information for executing the second action to the execution service 141*a* of the first app 141. The execution manager 141*a* may execute the second action and may send execution completion information to the execution manager 163 if the second action is completely executed. The execution manager 163, if receiving the execution completion information, may send execution request information for executing the third action to the execution service 141*a* of the first app 141. The execution manager 141*a* may execute the third action and may send execution completion information to the execution manager 163 if the third action is completely executed. The execution manager 163, if receiving the execution completion information, may send execution request information for executing the first action of the second app 143 to the execution service 143*a* of the second app 143. A result generated by executing the third action of the first app 141 may be sent to the second app 143. The second app 143 may use the generated result as a parameter for the actions of the second app 143. The second app 143 may sequentially execute the first action, the second action, and the third action, similarly to the first app 141.

Figure 6:
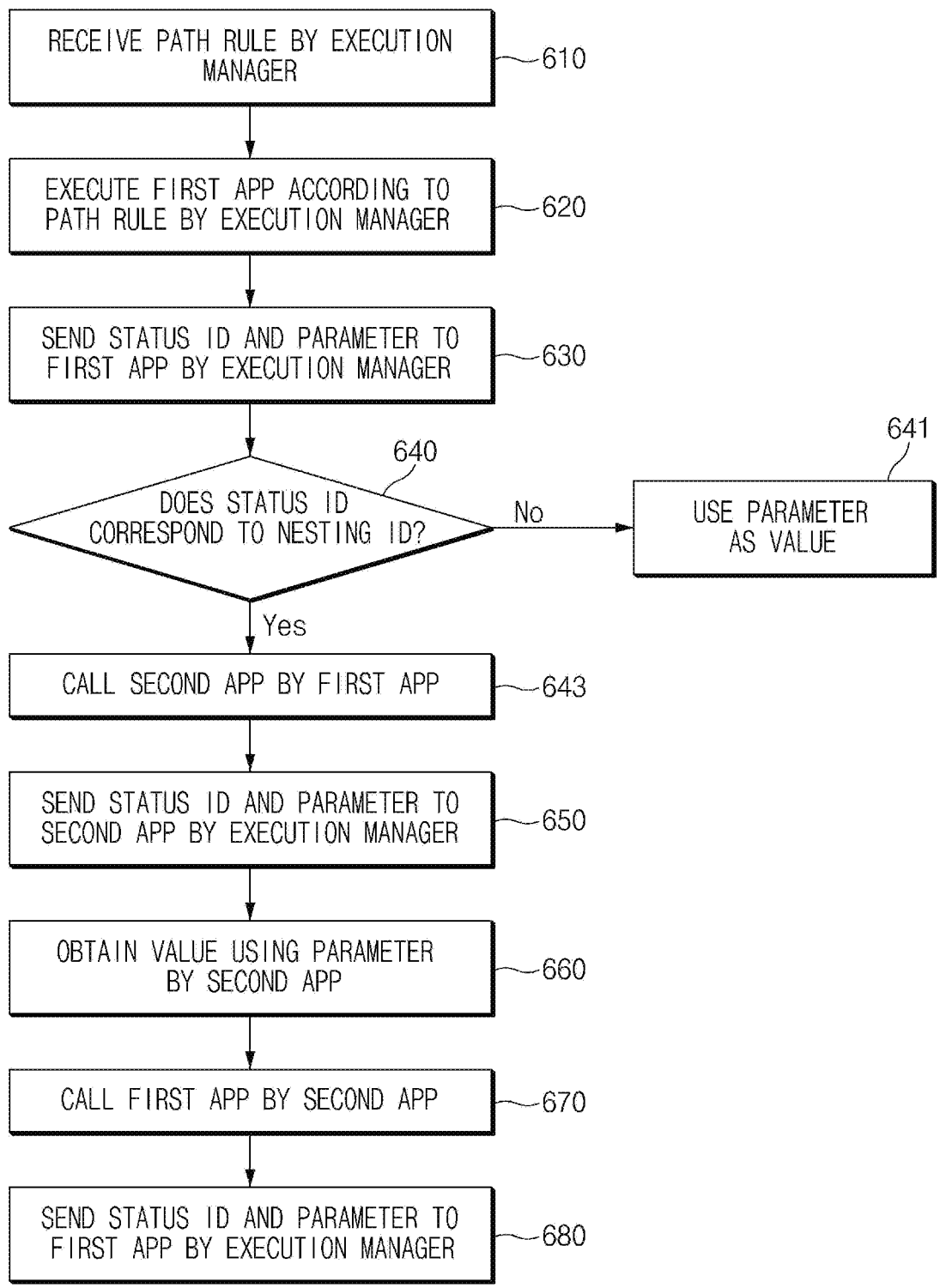
FIG. 6 is a flowchart illustrating a nesting action of user equipment according to an embodiment of the present disclosure.

FIG. 6 is a flowchart illustrating a nesting action of user equipment according to an embodiment of the present disclosure.

Referring to FIG. 6, a nesting action of the user equipment 100 may be an action of calling the second app 143 to obtain a value and calling the first app 141 to acquire the value, which is obtained from the second app 143, as a parameter necessary for executing an action of the first app 141. The intelligent server 200 may generate a path rule including the nesting action. For example, the path rule including the nesting action may include a status ID (or a nesting ID) (e.g., a status ID (CrossContactPicker) for executing a contact app or a status ID (CrossImagePicker) for executing an image app) that corresponds to the nesting action.

According to an embodiment, in operation 610, the execution manager 163 may receive the path rule. The path rule may include, for example, a nesting ID and a parameter corresponding to the nesting ID.

According to an embodiment, in operation 620, the execution manager 163 may execute the first app 141 (e.g., a message app, an e-mail app, or a web browser app) according to the path rule. For example, the execution manager 163 may bind the first app 141 and the second app 143 to the memory 140 (e.g., a volatile memory) according to the path rule and may execute the first app 141 according to the path rule. The first UI of the executed first app 141 may be displayed on the display 120 on the basis of a first status ID.

According to an embodiment, in operation 630, the execution manager 163 may send (or provide) execution request information to the first app 141 according to the path rule. The execution request information may include, for example, a second status ID and a first parameter necessary for the second status ID.

According to an embodiment, in operation 640, the execution service 141a of the first app 141 may determine whether the received second status ID corresponds to the nesting ID.

According to an embodiment, if the received second status ID does not correspond to the nesting ID, the first app 141 may, in operation 641, use the received first parameter as a value used for an action corresponding to the second status ID. The first app 141 may execute the action corresponding to the second status ID by using the first parameter.

According to an embodiment, if the received second status ID corresponds to the nesting ID, the first app 141 may, in operation 643, call the second app 143 (e.g., a contact app, a gallery app, a calendar app, or a cloud service app). A UI image of the first app 141 may not be displayed on the display 120 on the basis of the nesting ID. In other words, the nesting ID may not be associated with the UI of the first app 141. The nesting ID (e.g., CrossContactPicker) may include a portion that specifies a status ID (e.g., ContactPicker) sent to the second app 143. Accordingly, the first app 141 may call the second app 143 to execute an action corresponding to the portion that specifies the status ID sent to the second app 143.

According to an embodiment, in operation 650, the execution manager 163 may send execution request information to the second app 143 according to the path rule. The execution request information may include, for example, a third status ID corresponding to the nesting ID and a second parameter necessary for the third status ID. The second parameter may be identical to the first parameter received together with the nesting ID.

According to an embodiment, in operation 660, the second app 143 may obtain a value using the received first parameter. For example, the second app 143 may obtain the value by executing an action corresponding to the third status ID by using the first parameter received together with the nesting ID. The second UI of the second app 143 may be displayed on the display 120 on the basis of the third status ID.

According to an embodiment, in operation 670, the second app 143 may call the first app 141 according to the path rule. For example, the second app 143 may receive a status ID for calling the first app 141 from the execution manager 163.

According to an embodiment, in operation 680, the execution manager 163 may send execution request information to the first app 141 according to the path rule. The execution manager 163 may send, to the first app 141, a fourth status ID corresponding to the status of the first app 141 when the nesting action was executed and a third parameter identical to the value obtained by the second app 143. The first UI of the first app 141 may be displayed on the display 120 on the basis of the fourth status ID.

Accordingly, the user equipment 100 may use the value obtained by the second app 143 through the nesting action as a parameter necessary for executing an action of the first app 141.

Figure 7A:
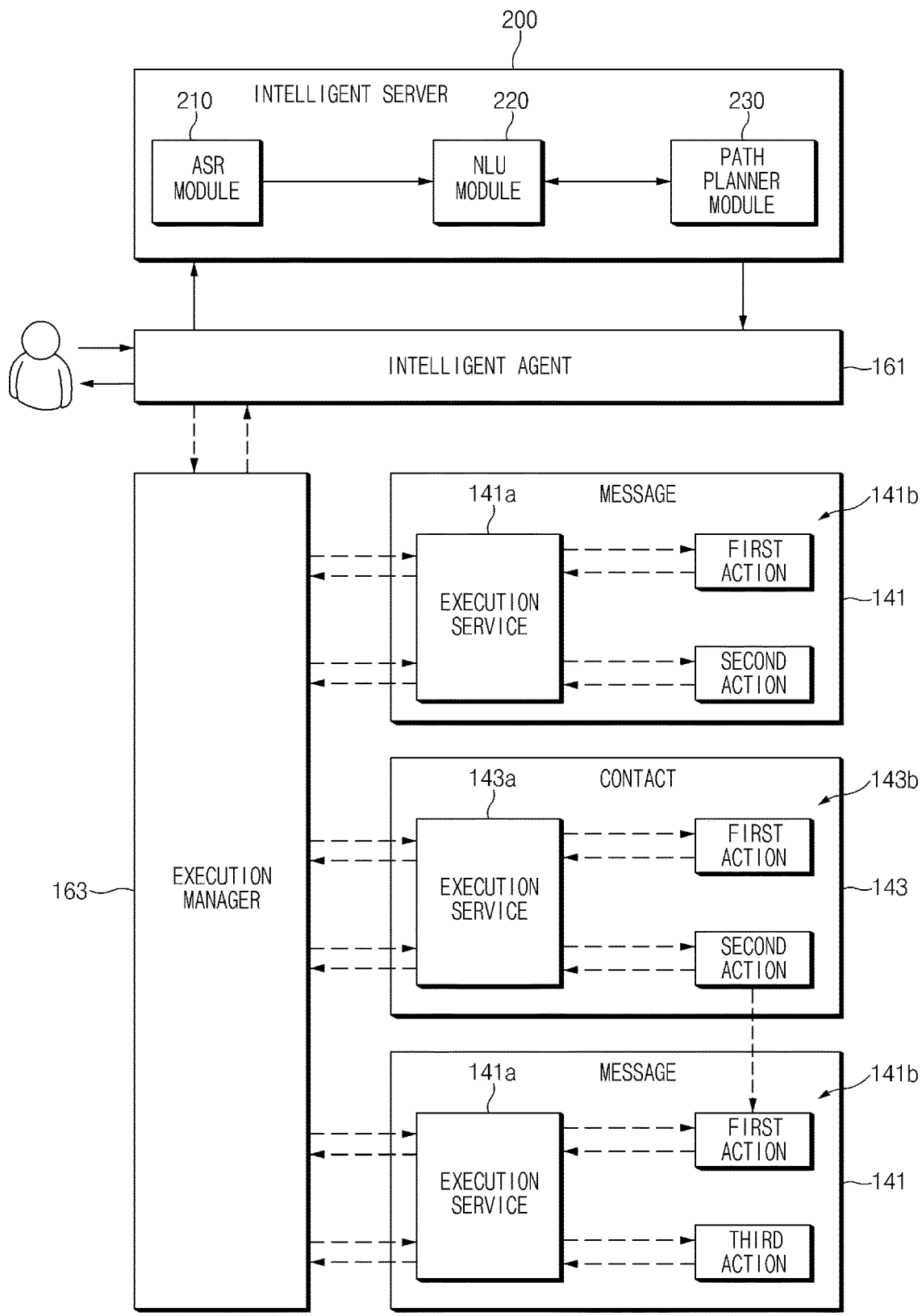
FIGS. 7A and 7B illustrate a case where user equipment executes a nesting action once, according to an embodiment of the present disclosure.
Figure 7B:
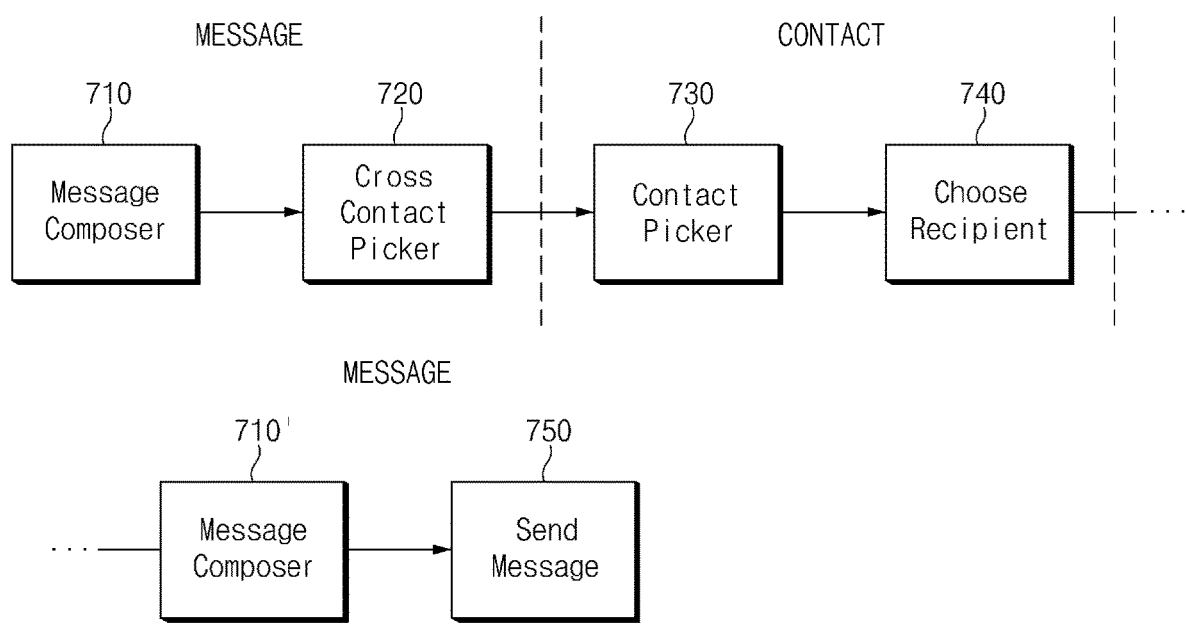

FIGS. 7A and 7B illustrate a case where user equipment executes a nesting action once, according to an embodiment of the present disclosure.

Referring to FIGS. 7A and 7B, the user equipment 100 may receive a user input from a user and may execute the message app 141 and the contact app 143 by receiving a path rule including a nesting action through the intelligent server 200. The message app 141 and the contact app 143 may be the same as the first app 141 and the second app 143 of FIG. 5.

Referring to FIG. 7A, the intelligent agent 161 of the user equipment 100 may receive a user input "Send my mother a message that I'm late today." from the user. The intelligent agent 161 may transmit a voice signal of the user input to the intelligent server 200.

According to an embodiment, the intelligent server 200 may determine an intent of the user input and parameters corresponding to the intent. For example, the intelligent server 200 may change the voice signal to text data "Send my mother a message that I'm late today." through the automatic speech recognition module 210. The intelligent server 200 may select "message" as a domain and may determine "send a message" as an intent and "my mother" and "I'm late today" as parameters, through the natural language understanding module 220.

According to an embodiment, the natural language understanding module 220 may generate a path rule on the basis of the intent and parameters of the user input. For example, the intelligent server 200 may generate a plurality of path rules through the natural language understanding module 220. According to an embodiment, the intelligent server 200 may determine a path rule to be transmitted to the user equipment 100, through the path planner module 230.

The path rule may include, for example, an action (or a first action) of composing a message by the message app 141, an action (or a second action) of nesting into the contact app 143 by the message app 141, and an action (or a third action) of sending the message by the message app 141. The path rule may include a status ID (e.g., MessageComposer) for composing a message, a status ID (e.g., CrossContactPicker) for nesting into the contact app 143, and a status ID (e.g., SendMessage) for sending a message, in which the status ID (e.g., MessageComposer), the status ID (e.g., CrossContactPicker), and the status ID (e.g., SendMessage) correspond to the action of composing a message, the action of nesting into the contact app 143, and the action of sending the message, respectively. Furthermore, the path rule may include parameters "my mother" and "I'm late today" that correspond to the status ID (e.g., CrossContactPicker) for nesting into the contact app 143 and the status ID (e.g., SendMessage) for sending a message, respectively.

The path rule may include an action (or a first action) of searching for a contact number by the contact app 143 and an action (or a second action) of selecting the contact number by the contact app 143. The path rule may include a status ID (e.g., ContactPicker) for searching for a contact number and a status ID (e.g., ChooseRecipient) for selecting a contact number, in which the status ID (e.g., ContactPicker) and the status ID (e.g., ChooseRecipient) correspond to the action of searching for a contact number and the action of selecting the contact number, respectively. The status ID (e.g., ContactPicker) for searching for a contact number may correspond to the status ID (e.g., CrossContactPicker) for nesting into the contact app 143 by the message app 141.

According to an embodiment, the intelligent server 200 may transmit the determined path rule to the user equipment 100.

According to an embodiment, the intelligent agent 161 of the user equipment 100 may receive the path rule and may forward the received path rule to the execution manager 163. The execution manager 163 may execute the actions 141*b* of the message app 141 and the actions 143*b* of the contact app 143 on the basis of the path rule.

According to an embodiment, the message app 141 may execute the action (or the first action) of composing a message. For example, the execution manager 163 may send, to the message app 141, execution request information including the status ID (e.g., MessageComposer) for composing a message. If the execution service 141*a* of the message app 141 receives the status ID, the message app 141 may execute an action of allowing a state in which a recipient's contact number and a message are to be input. If the action is completely executed, the execution service 141*a* may send action completion information to the execution manager 163.

According to an embodiment, the message app 141 may execute the action (or the second action) of nesting into the contact app 143. For example, the execution manager 163 may send, to the message app 141, execution request information that includes the status ID (e.g., CrossContactPicker) for nesting into the contact app 143 and the parameter "my mother". If the execution service 141*a* of the message app 141 receives the status ID, the message app 141 may execute an action of calling the contact app 143. If the action is completely executed, the execution service 141*a* may send action completion information to the execution manager 163.

According to an embodiment, the contact app 143 may execute the action of searching for a contact number (the first action of the contact app 143). For example, the execution manager 163 may send, to the contact app 143, execution request information that includes the status ID (e.g., ContactPicker) for searching for a contact number and the parameter "my mother" which is a parameter of a nesting ID of the message app 141. If the execution service 143*a* of the contact app 143 receives the status ID, the contact app 143 may execute an action of searching for the contact number of "my mother". If the action is completely executed, the execution service 143*a* may send action completion information to the execution manager 163.

According to an embodiment, the contact app 143 may execute the action of selecting a contact number (the second action of the contact app 143). For example, the execution manager 163 may send, to the contact app 143, execution request information including the status ID (e.g., ChooseRecipient) for selecting a contact number. The execution service 143*a* of the contact app 143, if receiving the status ID, may execute an action of selecting the found contact number (or value). If the action is completely executed, the execution service 143*a* may send action completion information to the execution manager 163. According to an embodiment, the contact app 143 may send the selected contact number to the message app 141.

According to an embodiment, the message app 141 may execute the action of composing a message (the first action of the message app 141) again. For example, the message app 141 may be called by the contact app 143 to execute the action of composing a message. For example, the execution manager 163 may send, to the message app 141, execution request information including the status ID (e.g., MessageComposer) for composing a message. The execution service 141*a* of the message app 141, if receiving the status ID, may use the contact number received from the contact app 143 as a parameter necessary for executing an action that corresponds to the status ID. The execution service 141*a* of the message app 141 may enter the selected contact number (e.g., the mother's contact number) into a recipient field of the message app 141. If the action is completely executed, the execution service 141*a* may send action completion information to the execution manager 163.

According to an embodiment, the message app 141 may execute the action of sending a message (the third action of the message app 141). For example, the execution manager 163 may send, to the message app 141, execution request information that includes the status ID (e.g., SendMessage) for sending a message and the parameter "I'm late today". The execution service 141*a* of the message app 141, if receiving the status ID, may enter "I'm late today" into a message field of the message app 141 and may send the input message. If the action is completely executed, the execution service 141*a* may send action completion information to the execution manager 163.

Referring to FIG. 7B, the message app 141 and the contact app 143 of the user equipment 100 may change in state as the actions included in the path rule are executed. Accordingly, screens of the changed states of the apps 141 and 143 may be displayed on the display 120 of the user equipment 100.

According to an embodiment, when the message app 141 receives the status ID (MessageComposer) for composing a message, a screen of a state 710 in which a message is to be composed may be displayed on the display 120. According to an embodiment, when the message app 141 receives the status ID (CrossContactPicker) for nesting into the contact app 143, a screen of a state 720 in which the contact app 143 is executed may be displayed on the display 120.

According to an embodiment, when the contact app 143 receives the status ID (ContactPicker) for searching for a contact number, a screen of a state 730 in which a contact number is found by using a parameter may be displayed on the display 120. According to an embodiment, when the contact app 143 receives the status ID (ChooseRecipient) for selecting a contact number, a screen of a state 740 in which the contact number is selected may be displayed on the display 120.

According to an embodiment, when the message app 141 receives the status ID (MessageComposer) for composing a message, a screen of a state 710' in which a message is to be composed and the selected contact number is entered into a recipient field may be displayed on the display 120. According to an embodiment, when the message app 141 receives the status ID (SendMessage) for sending a message, a screen of a state 750 in which a message is entered and sent may be displayed on the display 120.

According to another embodiment, the user equipment 100 may receive a user input "Send Hong Gil-Dong a message that I'm late today." from a user. The user equipment 100 may execute a nesting action in the message app 141 and may execute the contact app 143 to search for the contact number of "Hong Gil-Dong". In the case where a plurality of contact numbers of "Hong Gil-Dong" are found in the contact app 143, the user equipment 100 may stop executing an action of selecting a contact number. The screen of the state 730 in which the contact numbers are found may be maintained on the display 120. The user equipment 100 may receive, from the user, an additional input to select one of the plurality of contact numbers. The execution service 143*a* of the contact app 143 may send information about the suspended action and the message app 141 having executed the nesting action, to the intelligent agent 161 through the execution manager 163. The intelligent agent 161 may feed additionally-required information back to the user (e.g., inform the user of the additionally-required information through the speaker 130) on the basis of the information about the suspended action through the natural language generator module 240 and the text-to-speech module 250 of the intelligent server 200. If receiving an additional input (e.g., an additional voice input or an additional touch input) from the user, the intelligent agent 161 may receive a parameter for the suspended action through the intelligent server 200. The execution manager 163 may execute the suspended action in the contact app 143 by using the received parameter and may send the contact number of "Hong Gil-Dong", which is obtained from the contact app 143, to the message app 141 by using the information about the message app 141 having executed the nesting action.

Figure 8A:
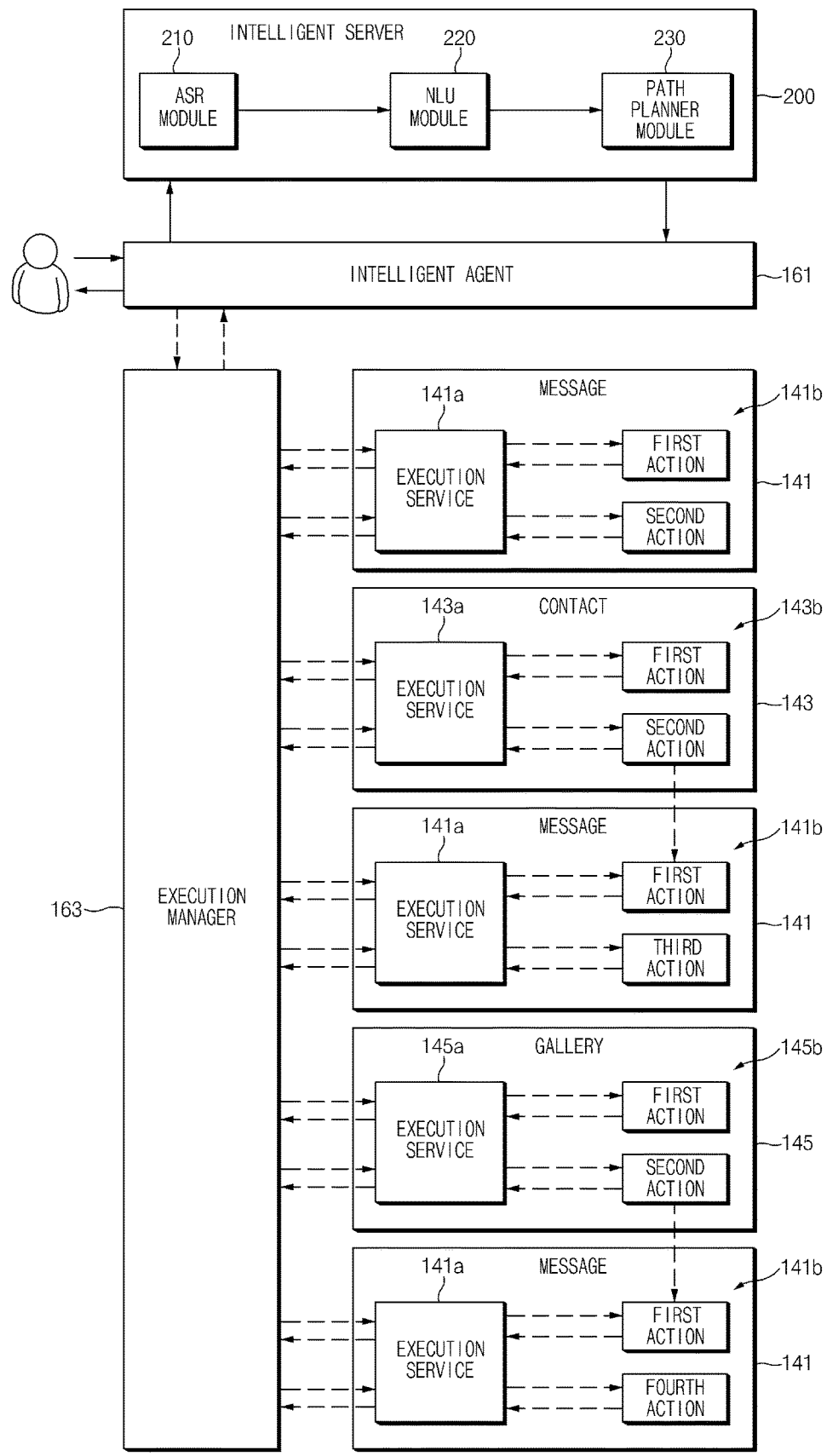
FIGS. 8A and 8B illustrate a case where user equipment executes a nesting action twice, according to an embodiment of the present disclosure.
Figure 8B:
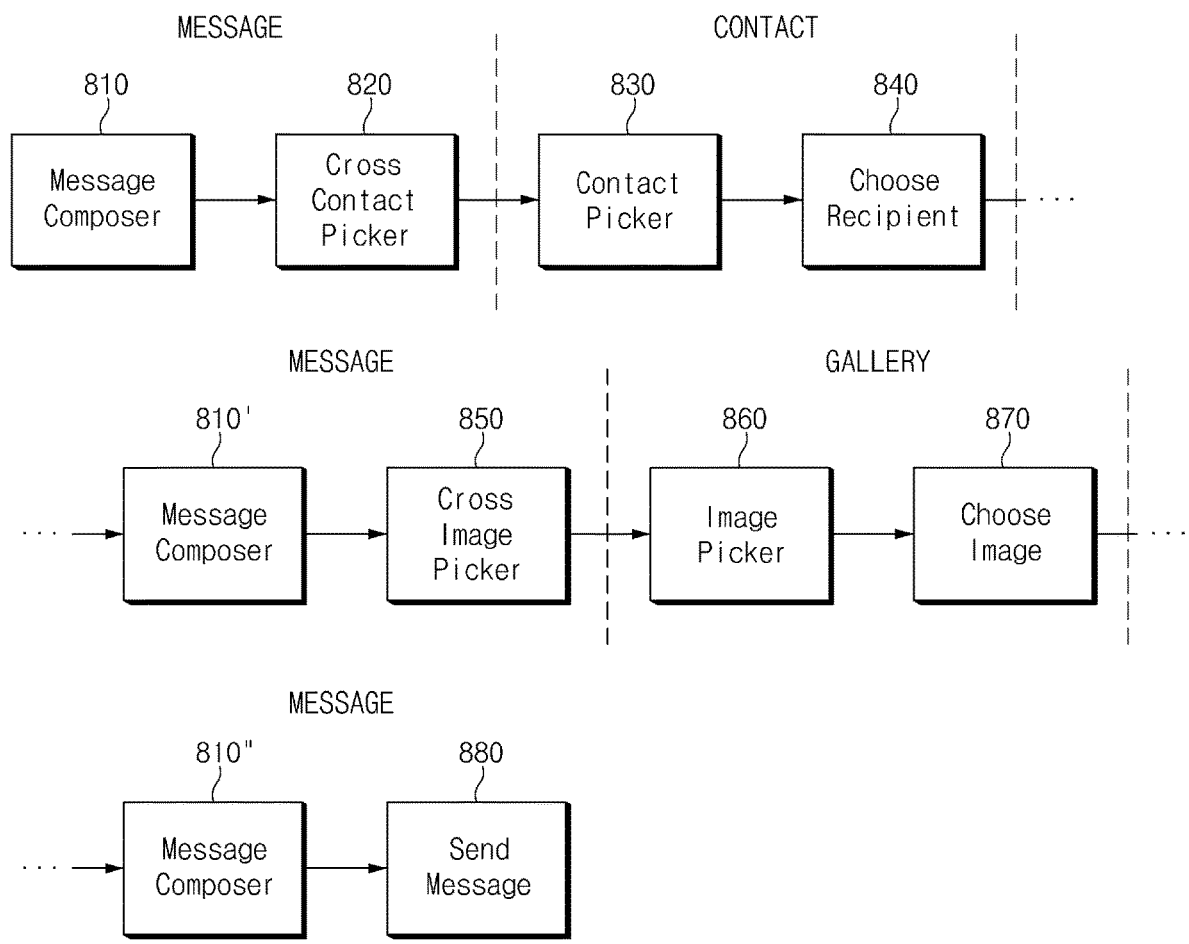

FIGS. 8A and 8B illustrate a case where user equipment executes a nesting action twice, according to an embodiment of the present disclosure.

Referring to FIGS. 8A and 8B, the user equipment 100 may receive a user input from a user and may execute the first app 141, the second app 143, and the third app 145 by receiving a path rule including nesting actions through the intelligent server 200.

Referring to FIG. 8A, the intelligent agent 161 of the user equipment 100 may receive a user input "Send my mother a photo taken in Hawaii and a message that I'm late today." from the user. The intelligent agent 161 may transmit a voice signal of the user input to the intelligent server 200.

According to an embodiment, the intelligent server 200 may determine an intent of the user input and parameters corresponding to the intent. For example, the intelligent server 200 may change the voice signal to text data "Send my mother a photo taken in Hawaii and a message that I'm late today." through the automatic speech recognition module 210. The intelligent server 200 may select "message" as a domain and may determine "send a photo and a message" as an intent and "my mother", "Hawaii", and "I'm late today" as parameters through the natural language understanding module 220.

According to an embodiment, a process in which the intelligent server 200 generates a path rule through the natural language understanding module 220 may correspond to the process in which the natural language understanding module 220 of the intelligent server 200 of FIG. 7A generates the path rule, and therefore a description thereof will be omitted.

The path rule generated by the natural language understanding module 220 of FIG. 8A may include, for example, an action of composing a message by the message app (or the first app) 141 (a first action of the first app 141), an action of nesting into the contact app (or the second app) 143 (a second action of the first app 141), an action of nesting into the gallery app (or the third app) 145 (a third action of the first app 141), and an action of sending the message (a fourth action of the first app 141). The path rule may include a status ID (e.g., MessageComposer) for composing a message, a status ID (e.g., CrossContactPicker) for nesting into the contact app 143, a status ID (e.g., CrossImagePicker) for nesting into the gallery app 145, and a status ID (e.g., SendMessage) for sending a message, in which the status ID (e.g., MessageComposer), the status ID (e.g., CrossContactPicker), the status ID (e.g., CrossImagePicker), and the status ID (e.g., SendMessage) correspond to the action of composing a message, the action of nesting into the contact app 143, the action of nesting into the gallery app 145, and the action of sending the message, respectively. Furthermore, the path rule may include parameters "my mother", "Hawaii", and "I'm late today" that correspond to the status ID (e.g., CrossContactPicker) for nesting into the contact app 143, the status ID (e.g., CrossImagePicker) for nesting into the gallery app 145, and the status ID (e.g., SendMessage) for sending a message, respectively.

A process in which actions are executed in the contact app (or the second app) 143 according to the path rule may correspond to the process in which the actions are executed in the contact app 143 of FIG. 7A, and therefore a description thereof will be omitted.

The path rule may further include an action of searching for an image by the gallery app (or the third app) 145 (a first action of the third app 145) and an action of selecting the image (a second action of the third app 145), compared with the path rule of FIG. 7A. The path rule may include a status ID (e.g., ImagePicker) for searching for an image and a status ID (e.g., ChooseImage) for selecting an image, in which the status ID (e.g., ImagePicker) and the status ID (e.g., ChooseImage) correspond to the action of searching for an image and the action of selecting the image, respectively. The status ID (e.g., ImagePicker) for searching for an image may correspond to the status ID (e.g., CrossImagePicker) for nesting into the gallery app 145.

According to an embodiment, the intelligent server 200 may transmit the determined path rule to the user equipment 100. According to an embodiment, the execution manager 163 may execute the actions 141*b* of the message app 141, the actions 143*b* of the contact app 143, and the actions 145*b* of the gallery app 145 on the basis of the path rule.

According to an embodiment, a process in which the message app 141 nests into the contact app 143 may correspond to the process in which the message app 141 nests into the contact app 143 in FIG. 7A, and therefore a description thereof will be omitted.

According to an embodiment, the message app 141 may execute the action of nesting into the gallery app 145 (the third action of the first app 141). For example, the execution manager 163 may send, to the message app 141, execution request information that includes the status ID (e.g., CrossImagePicker) for nesting into the gallery app 145 and the parameter "Hawaii". If the execution service 141*a* of the message app 141 receives the status ID, the message app 141 may execute an action of calling the gallery app 145. If the action is completely executed, the execution service 141*a* may send action completion information to the execution manager 163.

According to an embodiment, the gallery app 145 may execute the action of searching for an image (the first action of the third app 145). For example, the execution manager 163 may send, to the gallery app 145, execution request information that includes the status ID (e.g., ImagePicker) for searching for an image and the parameter "Hawaii" which is a parameter of a nesting ID of the message app 141. If the execution service 145*a* of the gallery app 145 receives the status ID, the gallery app 145 may search for an image taken in "Hawaii". If the action is completely executed, the execution service 145*a* may send action completion information to the execution manager 163.

According to an embodiment, the gallery app 145 may execute the action of selecting an image (the second action of the third app 145). For example, the execution manager 163 may send, to the gallery app 145, execution request information including the status ID (e.g., ChooseImage) for selecting an image. If the execution service 145*a* of the gallery app 145 receives the status ID, the gallery app 145 may select the found image (or value). If the action is completely executed, the execution service 145*a* may send action completion information to the execution manager 163. According to an embodiment, the gallery app 145 may send the selected image to the message app 141.

According to an embodiment, the message app 141 may execute the action of composing a message (the first action of the first app 141) again. For example, the message app 141 may be called by the gallery app 145 to execute the action of composing a message. For example, the execution manager 163 may send, to the message app 141, execution request information that includes the status ID (e.g., MessageComposer) for composing a message and the same parameter as that of the image selected by the gallery app 145. If the execution service 141*a* of the message app 141 receives the status ID, the message app 141 may execute an action of attaching the selected image (e.g., a photo taken in Hawaii). If the action is completely executed, the execution service 141*a* may send action completion information to the execution manager 163.

According to an embodiment, the message app 141 may execute the action of sending a message (the third action of the first app 141). For example, the execution manager 163 may send, to the message app 141, execution request information that includes the status ID (e.g., SendMessage) for sending a message and the parameter "I'm late today". The execution service 141*a* of the message app 141, if receiving the status ID, may enter "I'm late today" into a message field of the message app 141 and may send the input message. If the action is completely executed, the execution service 141*a* may send action completion information to the execution manager 163.

Referring to FIG. 8B, the message app 141, the contact app 143, and the gallery app 145 of the user equipment 100 may change in state as the actions included in the path are executed. Accordingly, screens of the changed states of the apps 141, 143, and 145 may be displayed on the display 120 of the user equipment 100.

According to an embodiment, a screen of a state 810 in which a message is to be composed, a screen of a state 820 in which the contact app 143 is executed, a screen of a state 830 in which a contact number is found, a screen of a state 840 in which the contact number is selected, and a screen of a state 810' in which the selected contact number is entered into a recipient field may correspond to the screen of the state 710 in which the message is to be composed, the screen of the state 720 in which the contact app 143 is executed, the screen of the state 730 in which the contact number is found, the screen of the state 740 in which the contact number is selected, and the screen of the state 710' in which the selected contact number is entered into the recipient field, respectively, which are illustrated in FIG. 7B, and therefore descriptions thereof will be omitted.

According to an embodiment, when the message app 141 receives the status ID (CrossImagePicker) for nesting into the gallery app 145, a screen of a state 850 in which the gallery app 145 is executed may be displayed on the display 120.

According to an embodiment, when the gallery app 145 receives the status ID (ImagePicker) for searching for an image, a screen of a state 860 in which an image is to be searched for may be displayed on the display 120. According to an embodiment, when the gallery app 145 receives the status ID (ChooseImage) for selecting an image, a screen of a state 870 in which an image is selected may be displayed on the display 120.

According to an embodiment, when the message app 141 receives the status ID (MessageComposer) for composing a message, a screen of a state 810" in which a message is to be composed and the selected contact number is entered into a recipient field may be displayed on the display 120. According to an embodiment, when the gallery app 145 receives the status ID (SendMessage) for sending a message, a screen of a state 880 in which a message is entered and sent may be displayed on the display 120.

According to the various embodiments of the present disclosure described above with reference to FIGS. 1 to 8B, the user equipment 100 may recognize a user's speech to determine the user's intent and may generate a path rule corresponding to the determined intent to execute apps stored in the user equipment 100, thereby providing the same user interface (UI) as that obtained by performing a touch to the user.

The user equipment 100, when executing the apps according to the path rule, may obtain a parameter necessary for executing an action in the first app 141, by executing a nesting action (or a regression action) of executing the second app 143 to generate a value and then executing the first app 141 again to send the generated value to the first app 141. Accordingly, the user equipment 100 may organizationally control the apps stored in the user equipment 100 to provide various methods of providing a result corresponding to a user input.

Figure 9:
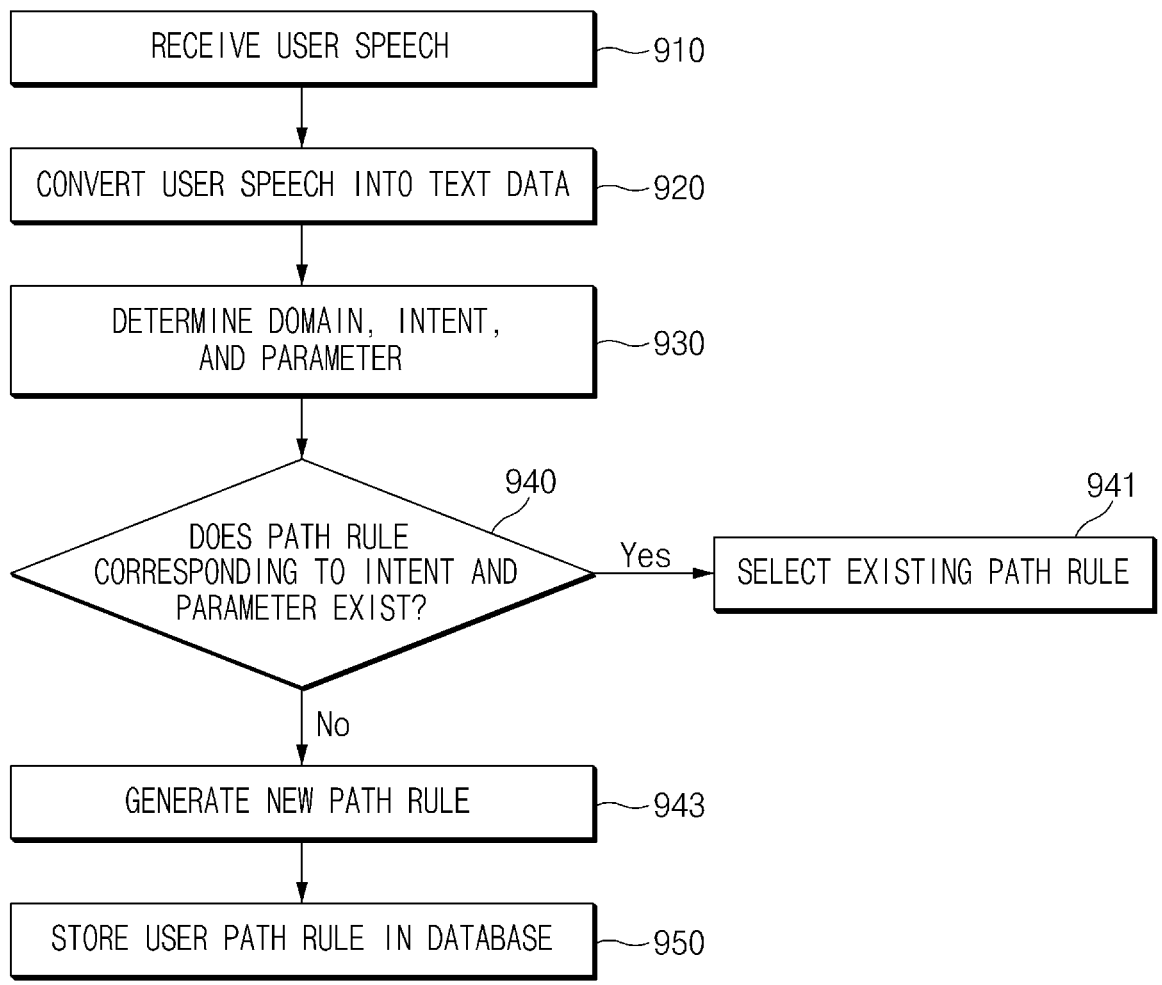
FIG. 9 is a flowchart illustrating a method for generating a new path rule by an intelligent server, according to an embodiment of the present disclosure.

FIG. 9 is a flowchart illustrating a method for generating a new path rule by an intelligent server, according to an embodiment of the present disclosure.

Referring to FIG. 9, the intelligent server 200 may generate a path rule in the case where there is no path rule corresponding to a user input in a database.

According to an embodiment, in operation 910, the intelligent server 200 may receive a user input from the user equipment 100. For example, the intelligent server 200 may receive a voice signal from the user equipment 100.

According to an embodiment, in operation 920, the intelligent server 200 may change the user input to text data. For example, the automatic speech recognition module 210 of the intelligent server 200 may receive a voice signal from the user equipment 100 and may change the voice signal to text data.

According to an embodiment, in operation 930, the intelligent server 200 may determine a domain and an intent corresponding to the user input and parameters necessary for determining the intent. For example, the natural language understanding module 220 of the intelligent server 200 may determine the domain, the intent, and the parameters corresponding to the user input by using a matching rule that is divided into a domain, an intent, and parameters necessary for determining the intent.

According to an embodiment, in operation 940, the intelligent server 200 may determine whether a path rule corresponding to the user input exists. For example, the natural language understanding module 220 may receive a rule set including a plurality of path rules from the path rule database 231 connected to the path planner module 230. The natural language understanding module 220 may determine whether a path rule corresponding to the intent and parameters of the user input exists in the rule set.

According to an embodiment, in operation 941, the intelligent server 200 may select an existing path rule if a path rule corresponding to the user input exists (YES). For example, the natural language understanding module 220 may select a path rule corresponding to the intent and parameters of the user input from the received rule set.

According to an embodiment, in operation 943, the intelligent server 200 may generate a new path rule if a path rule corresponding to the user input does not exist (NO). For example, the path planner module 230 may generate a path rule corresponding to the user input. A method for generating the path rule will be described below in detail with reference to FIG. 10.

According to an embodiment, in operation 950, the intelligent server 200 may store the generated new path rule in a database. For example, the path planner module 230 may store the generated new path rule in the path rule database 231.

Figure 10:
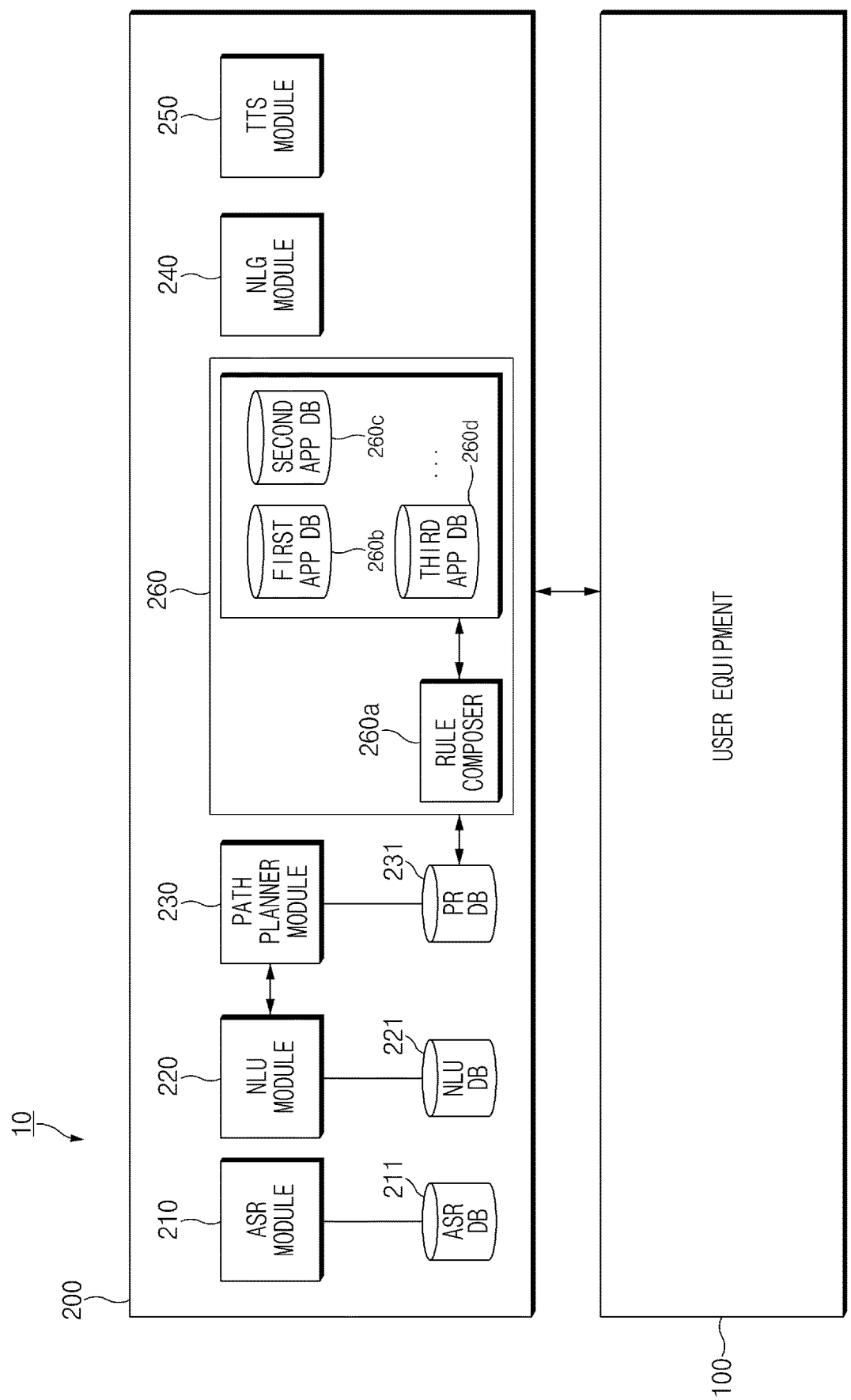
FIG. 10 is a block diagram illustrating a configuration for generating a path rule of an intelligent server of an integrated intelligent system, according to an embodiment of the present disclosure.

FIG. 10 is a block diagram illustrating a configuration for generating a path rule of an intelligent server of an integrated intelligent system, according to an embodiment of the present disclosure.

Referring to FIG. 10, the intelligent server 200 may further include an app path rule database 260 connected to the path rule database 231. The path planner module 230 may generate a path rule through the app path rule database 260.

The app path rule database 260 may include a rule composer 260a and a plurality of app path rule databases 260b, 260c, and 260d.

The rule composer 260a may generate a path rule on the basis of a user's intent and parameters necessary for determining the user's intent. For example, in the case where a rule set stored in the path rule database 231 has no path rule corresponding to the user's intent and the parameters, the rule composer 260a may generate a path rule corresponding to the user's intent and the parameters.

According to an embodiment, the rule composer 260a may generate a path rule (or a full path rule) on the basis of the user's intent and the parameters. For example, the rule composer 260a may receive apps to be executed according to the user's intent and tasks to be performed in the apps from the natural language understanding module 220 and may select a plurality of path rules (e.g., partial path rules) that correspond to the apps to be executed and the tasks to be performed in the apps and execute actions of the apps. The rule composer 260a may generate a path rule corresponding to a user input by arranging the selected app path rules. According to an embodiment, the rule composer 260a may store the generated path rule in the path rule database 231. For example, the rule composer 260a may manually or automatically store the generated path rule in the path rule database 231. For example, in the case where there is no path rule matching a plurality of path rules included in the rule set stored in the path rule database 231, the rule composer 260a may automatically store the generated path rule in the path rule database 231.

According to an embodiment, the path planner module 230 may send the path rule stored in the path rule database 231 to the natural language understanding module 220. For example, the path planner module 230 may send a path rule generated by the rule composer 260a and stored in the path rule database 231 to the natural language understanding module 220.

According to an embodiment, the rule composer 260a may receive app path rules from the app databases 260b, 260c, and 260d. The app databases 260b, 260c, and 260d may store path rules corresponding to tasks to be performed in apps stored in the user equipment 100. The app databases 260b, 260c, and 260d may include, for example, the first app database 260b, the second app database 260c, and the third app database 260d that store the path rules corresponding to the tasks to be performed in the apps. The first app database 260b, the second app database 260c, and the third app database 260d may store path rules corresponding to tasks to be performed in the first app 141, the second app 143, and the third app 145.

According to an embodiment, the app databases 260b, 260c, and 260d may store the app path rules according to the types thereof. For example, the app databases 260b, 260c, and 260d may distinguish between the app path rules depending on whether another app path rule is located before and/or after an app path rule. The types of app path rules may include, for example, a normal rule, a caller rule, a callee rule, and a caller/callee rule.

The normal rule may be a path rule having no rule before and after the normal rule. For example, the normal rule may not include a status ID (e.g., a nesting ID) for calling an app different from a running app.

The caller rule may be a path rule that is able to have another path rule arranged after the caller rule. For example, the caller rule may include a status ID (e.g., CrossImagePicker) for calling an app different from a running app. In the case of a user input "Change a photo of Hawaii to a black-and-white photo and send it to my mother using a message app", a path rule for selecting an image of Hawaii in a gallery app may be a caller rule.

The callee rule may be a path rule that is able to have another path rule arranged before the callee rule. For example, a path rule arranged before the callee rule may include a status ID for calling an app different from a running app. The callee rule may include a status ID (e.g., ImagePicker) included in the path rule arranged before the callee rule and corresponding to a status ID (e.g., CrossImagePicker) for calling another app. In the case of a user input "Change a photo of Hawaii to a black-and-white photo and send it to my mother using a message app", a path rule for sending an image to the mother using the message app may be a callee rule.

The callee/caller rule may be a path rule that is able to have other path rules arranged before and after the callee/caller rule. For example, a caller rule may include a status ID for calling an app different from a running app. A path rule arranged before a callee rule may include a status ID for calling an app different from a running app. In the case of a user input "Change a photo of Hawaii to a black-and-white photo and send it to my mother using a message app", a path rule for changing a photo of Hawaii to a black-and-white photo may be a callee/caller rule.

According to an embodiment, the rule composer 260*a* may generate combination path rules by arranging the separately stored app path rules. According to a user input, the combination path rules may be distinguished into, for example, a normal rule, a static caller rule, a static callee rule, a dynamic caller rule, a dynamic callee rule, a static callee/static caller rule, a static callee/dynamic caller rule, a dynamic callee/static caller rule, and a dynamic callee/caller rule.

The normal rule may be a combination path rule that is sufficient to execute actions of apps according to a user input and has no path rule before and after the normal rule. In the case of a user input "Change a photo of Hawaii to a black-and-white photo", a path rule generated by arranging a path rule of a gallery app and a path rule of an image editing app may be a normal rule.

The static caller rule may be a combination path rule that is sufficient to execute actions of apps according to a user input and is able to have another path rule arranged after the static caller rule. In the case of a user input "Change a photo of Hawaii to a black-and-white photo and send it to my mother using a message app", a combination path rule for selecting an image of Hawaii in a gallery app and changing the selected image to a black-and-white image in an image editing app may be a static caller rule. A path rule for sending an image in a message app may be arranged after the static caller rule.

The static callee rule may be a combination path rule that is sufficient to execute actions of apps according to a user input and is able to have another path rule arranged before the static callee rule. In the case of a user input "Change a photo of Hawaii to a black-and-white photo and send it to my mother using a message app," a combination path rule for changing an image to a black-and-white image in an image editing app and sending the edited image in a message app may be a static callee rule. A path rule for selecting an image of Hawaii in a gallery app may be arranged before the static callee rule.

The dynamic caller rule may be a combination path rule that is insufficient to execute actions of apps according to a user input and is able to have another path rule arranged before the dynamic caller rule. In the case of a user input "Change a photo of Hawaii to a black-and-white photo and share it with my mother", a combination path rule for selecting an image of Hawaii in a gallery app and changing the selected image to a black-and-white image in an image editing app may be a dynamic caller rule. Since the user input has no sufficient information about which app is used to share the image, the dynamic caller rule may send the edited image by using any one of a message app and an e-mail app.

The static callee/static caller rule may be a combination path rule that is insufficient to execute actions of apps according to a user input and is able to have other path rules arranged before and after the static callee/static caller rule. The path rules arranged before and after the static callee/static caller rule may be specified path rules. For example, the static callee/static caller rule may be generated by combining a static callee rule and a static caller rule.

The static callee/dynamic caller rule may be a combination path rule that is insufficient to execute actions of apps according to a user input and is able to have other path rules arranged before and after the static callee/dynamic caller rule. A specified path rule may be arranged before the static callee/dynamic caller rule, and one of a plurality of app path rules may be arranged after the static callee/dynamic caller rule. For example, the static callee/dynamic caller rule may be generated by combining a static callee rule and a dynamic caller rule.

The dynamic callee/static caller rule may be a combination path rule that is insufficient to execute actions of apps according to a user input and is able to have other path rules arranged before and after the dynamic callee/static caller rule. One of a plurality of app path rules may be arranged before the dynamic callee/static caller rule, and a specified path rule may be arranged after the dynamic callee/static caller rule. For example, the dynamic callee/static caller rule may be generated by combining a dynamic callee rule and a static caller rule.

The dynamic callee/dynamic caller rule may be a combination path rule that is insufficient to execute actions of apps according to a user input and is able to have other path rules arranged before and after the dynamic callee/dynamic caller rule. One of a plurality of app path rules may be arranged before and after the dynamic callee/dynamic caller rule. For example, the dynamic callee/dynamic caller rule may be generated by combining a dynamic callee rule and a dynamic caller rule.

Accordingly, the rule composer 260*a* may generate a path rule (or a full path rule) corresponding to a user input by arranging the plurality of app path rules separately stored in the app databases 260*b*, 260*c*, and 260*d*.

According to the various embodiments of the present disclosure described above with reference to FIGS. 9 and 10, the intelligent server 200 may generate a path rule corresponding to a user input by arranging path rules stored in the database 260 and corresponding to actions of apps of the user equipment 100, thereby effectively generating path rules corresponding to various and complex user inputs.

An electronic device according to various embodiments may include a housing, a touch screen display located inside the housing and exposed through a first portion of the housing, a microphone located inside the housing and exposed through a second portion of the housing, at least one speaker located inside the housing and exposed through a third portion of the housing, a communication circuit located inside the housing, a processor located inside the housing and electrically connected with the touch screen display, the microphone, the speaker, and the communication circuit, and a memory located inside the housing and electrically connected with the processor. The memory may store a first application program including a first user interface (UI) and a second application program including a second UI. When an instruction stored in the memory is executed, the processor may perform the following operations: receiving a user input through at least one of the touch screen display and the microphone, in which the user input includes a request to perform a task by using the first application program and the second application program; transmitting data relating to the user input to an external server through the communication circuit; receiving a response from the external server through the communication circuit, in which the response includes information about a sequence of statuses of the electronic device for performing the task, the information includes a plurality of status IDs corresponding to the respective statuses, and the plurality of status IDs include a first status ID, a second status ID, a third status ID, and a fourth status ID that differ from one another; executing the first application program and displaying the first UI on the touch screen display on the basis of the first status ID after receiving the response; executing the second application program on the basis of the second status ID after displaying the first UI; displaying the second UI on the touch screen display on the basis of the third status ID and obtaining at least one parameter to be used in the first UI after executing the second application program; and displaying the first UI on the touch screen display on the basis of the fourth status ID and filling the first UI with the obtained at least one parameter after displaying the second UI.

According to various embodiments, the first application program may include at least one of a message application program, an e-mail application program, and a web browser application program.

According to various embodiments, the second application program may include at least one of a contact application program, a gallery application program, a calendar application program, and a cloud service application program.

According to various embodiments, at least one of the plurality of status IDs may include at least a portion of a name of an application program.

According to various embodiments, at least one of the plurality of status IDs may not be associated with a UI of an application program.

According to various embodiments, the response may be generated by the external server on the basis of the data relating to the user input.

According to various embodiments, when the instruction stored in the memory is executed, the processor may transmit information of the electronic device to the external server through the communication circuit, and the response may be generated by the external server on the basis of the data relating to the user input and the information of the electronic device.

According to various embodiments, the information of the electronic device may include at least one of operating system (OS) information and application program information.

According to various embodiments, when the instruction stored in the memory is executed, the processor may generate a value in the second UI displayed on the touch screen display by using a parameter corresponding to the second status ID and may obtain the generated value as a parameter to be used in the first UI.

According to various embodiments, the second status ID may include a portion that specifies the third status ID, and when the instruction stored in the memory is executed, the processor may execute the second application program to execute an action corresponding to the portion that specifies the third status ID.

According to various embodiments, the plurality of status IDs included in the request may correspond to statuses of the electronic device according to actions of the first and second application programs that perform the task.

A control method of an electronic device, according to various embodiments, may include receiving a user input including a request to perform a task by using a first application program and a second application program, through at least one of a touch screen display and a microphone, transmitting data relating to the user input to an external server through a communication circuit, receiving a response including information about a sequence of statuses of the electronic device for performing the task, from the external server through the communication circuit, executing the first application program and displaying a first UI on the touch screen display on the basis of a first status ID included in the information after receiving the response, executing the second application program on the basis of a second status ID included in the information after displaying the first UI, displaying a second UI of the second application program on the touch screen display on the basis of a third status ID included in the information and obtaining at least one parameter to be used in the first UI after executing the second application program, and displaying the first UI on the touch screen display on the basis of a fourth status ID included in the information and filling the first UI with the obtained at least one parameter after displaying the second UI.

According to various embodiments, at least one of the first to fourth status IDs may include at least a portion of a name of an application program.

According to various embodiments, at least one of the first to fourth status IDs may not be associated with a UI of an application program.

According to various embodiments, the response may be generated by the external server on the basis of the data relating to the user input.

According to various embodiments, the method may further include transmitting information of the electronic device to the external server through the communication circuit, and the response may be generated by the external server on the basis of the data relating to the user input and the information of the electronic device.

According to various embodiments, the obtaining of the at least one parameter to be used in the first UI may include generating a value in the second UI displayed on the touch screen display by using a parameter corresponding to the second status ID, and obtaining the generated value as the parameter to be used in the first UI.

According to various embodiments, the second status ID may include a portion that specifies the third status ID, and the executing of the second application program on the basis of the first status ID included in the information may include executing the second application program to execute an action corresponding to the portion that specifies the third status ID.

According to various embodiments, the first to fourth status IDs included in the request may correspond to statuses of the electronic device according to actions of the first and second application programs that perform the task.

A server according to various embodiments may receive, from an external electronic device, data relating to a user input including a request to perform a task by using a first application program and a second application program, may generate text data on the basis of the data relating to the user input, may determine an intent of the user input and a parameter corresponding to the intent and necessary for performing the task, on the basis of the text data, may generate a response including information about a sequence of statuses of the electronic device for performing the task, on the basis of the intent and the parameter, and may transmit the response to the external electronic device.

An electronic device according to various embodiments may include a display, one or more microphones, a memory that stores a first application program including a first user interface (UI) and a second application program including a second UI, and a processor electrically connected with the display and the one or more microphones. When receiving, through at least one of the display and the microphones, a user input including a request to perform a task by using the first application program and the second application program, the processor may execute the first application program, may display the first UI on the display, and may execute the second application program after displaying the first UI.

According to various embodiments, the processor may display the second UI on the display and obtain at least one parameter to be used in the first UI after executing the second application program, and may display the first UI on the display and fill the first UI with the obtained at least one parameter after displaying the second UI.

A control method of an electronic device, according to various embodiments, may include receiving a user input including a request to perform a task by using a first application program and a second application program, through at least one of a display and a microphone, executing the first application program, displaying a first UI on the display, and executing the second application program after displaying the first UI.

According to various embodiments, the method may further include displaying a second UI on the display and obtaining at least one parameter to be used in the first UI after executing the second application program, and displaying the first UI on the display and filling the first UI with the obtained at least one parameter after displaying the second UI.

Figure 11:
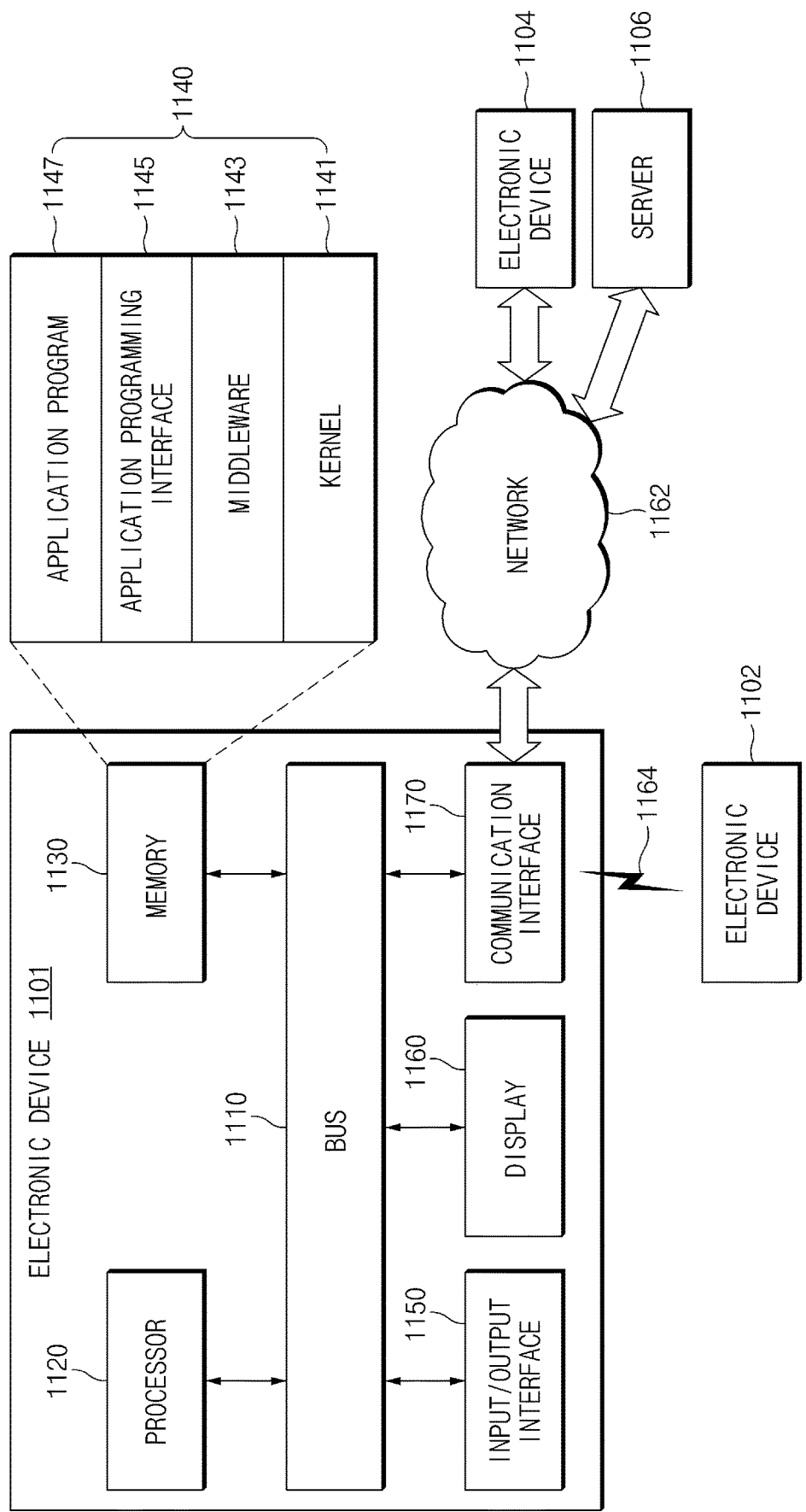
FIG. 11 illustrates an electronic device in a network environment according to various embodiments of the present disclosure.

FIG. 11 illustrates an electronic device in a network environment, according to various embodiments.

Referring to FIG. 11, according to various embodiments, an electronic device 1101, a first electronic device 1102, a second electronic device 1104, or a server 1106 may be connected with each other over a network 1162 or local wireless communication 1164. The electronic device 1101 may include a bus 1110, a processor 1120, a memory 1130, an input/output interface 1150, a display 1160, and a communication interface 1170. According to an embodiment, the electronic device 1101 may not include at least one of the above-described elements or may further include other element(s).

For example, the bus 1110 may interconnect the above-described elements 1110 to 1170 and may include a circuit for conveying communications (e.g., a control message and/or data) among the above-described elements.

The processor 1120 may include one or more of a central processing unit (CPU), an application processor (AP), or a communication processor (CP). For example, the processor 1120 may perform an arithmetic operation or data processing associated with control and/or communication of at least other elements of the electronic device 1101.

The memory 1130 may include a volatile and/or nonvolatile memory. For example, the memory 1130 may store instructions or data associated with at least one other element(s) of the electronic device 1101. According to an embodiment, the memory 1130 may store software and/or a program 1140. The program 1140 may include, for example, a kernel 1141, a middleware 1143, an application programming interface (API) 1145, and/or an application program (or "an application") 1147. At least a part of the kernel 1141, the middleware 1143, or the API 1145 may be referred to as an "operating system (OS)".

For example, the kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete elements of the electronic device 1101 so as to control or manage system resources.

The middleware 1143 may perform, for example, a mediation role such that the API 1145 or the application program 1147 communicates with the kernel 1141 to exchange data.

Furthermore, the middleware 1143 may process one or more task requests received from the application program 1147 according to a priority. For example, the middleware 1143 may assign the priority, which makes it possible to use a system resource (e.g., the bus 1110, the processor 1120, the memory 1130, or the like) of the electronic device 1101, to at least one of the application program 1147. For example, the middleware 1143 may process the one or more task requests according to the priority assigned to the at least one, which makes it possible to perform scheduling or load balancing on the one or more task requests.

The API 1145 may be, for example, an interface through which the application program 1147 controls a function provided by the kernel 1141 or the middleware 1143, and may include, for example, at least one interface or function (e.g., an instruction) for a file control, a window control, image processing, a character control, or the like.

The input/output interface 1150 may play a role, for example, an interface which transmits an instruction or data input from a user or another external device, to other element(s) of the electronic device 1101. Furthermore, the input/output interface 1150 may output an instruction or data, received from other element(s) of the electronic device 1101, to a user or another external device.

The display 1160 may include, for example, a liquid crystal display (LCD), a light-emitting diode (LED) display, an organic LED (OLED) display, a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a part of a user's body.

For example, the communication interface 1170 may establish communication between the electronic device 1101 and an external device (e.g., the first electronic device 1102, the second electronic device 1104, or the server 1106). For example, the communication interface 1170 may be connected to the network 1162 over wireless communication or wired communication to communicate with the external device (e.g., the second electronic device 1104 or the server 1106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the local wireless communication 1164. The local wireless communication 1164 may include at least one of wireless fidelity (Wi-Fi), light fidelity (Li-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1162 may include at least one of telecommunications networks, for example, a computer network (e.g., LAN or WAN), an Internet, or a telephone network.

Each of the first and second electronic devices 1102 and 1104 may be a device of which the type is different from or the same as that of the electronic device 1101. According to an embodiment, the server 1106 may include a group of one or more servers. According to various embodiments, all or a portion of operations that the electronic device 1101 will perform may be executed by another or plural electronic devices (e.g., the first electronic device 1102, the second electronic device 1104 or the server 1106). According to an embodiment, in the case where the electronic device 1101 executes any function or service automatically or in response to a request, the electronic device 1101 may not perform the function or the service internally, but, alternatively additionally, it may request at least a portion of a function associated with the electronic device 1101 at other electronic device (e.g., the electronic device 1102 or 1104 or the server 1106). The other electronic device may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
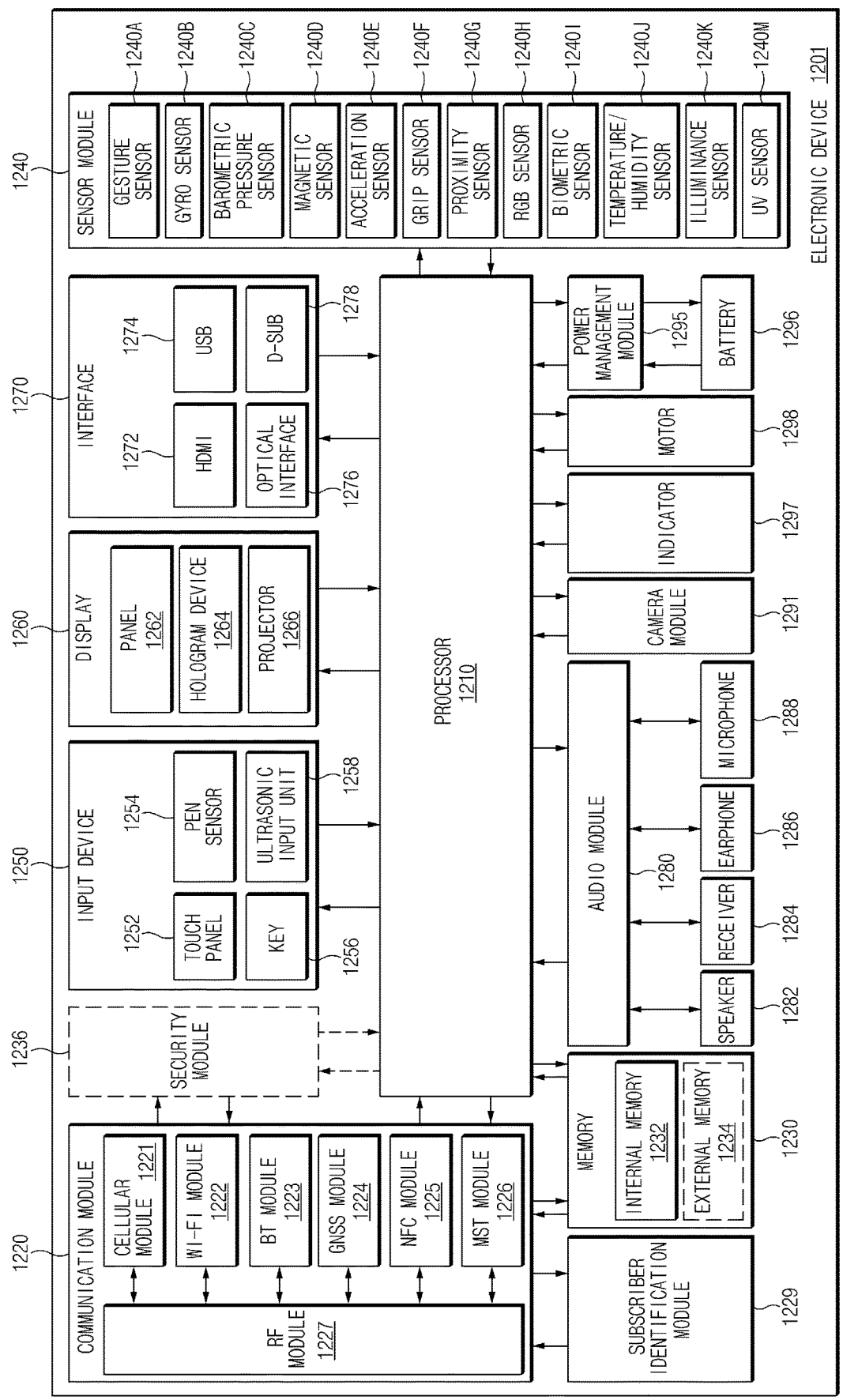
FIG. 12 is a block diagram of an electronic device according to various embodiments of the present disclosure.

FIG. 12 illustrates a block diagram of an electronic device, according to various embodiments.

Referring to FIG. 12, an electronic device 1201 may include, for example, all or a part of the electronic device 1101 illustrated in FIG. 11. The electronic device 1201 may include one or more processors (e.g., an application processor (AP)) 1210, a communication module 1220, a subscriber identification module 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software elements connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of elements illustrated in FIG. 12. The processor 1210 may load an instruction or data, which is received from at least one of other elements (e.g., a nonvolatile memory), into a volatile memory and process the loaded instruction or data. The processor 1210 may store a variety of data in the nonvolatile memory.

The communication module 1220 may be configured the same as or similar to the communication interface 1170 of FIG. 11. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1230 (e.g., the memory 1130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or generally, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, or a keypad. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 1160) may include a panel 1262, a hologram device 1264, or a projector 1266. The panel 1262 may be the same as or similar to the display 1160 illustrated in FIG. 11. The panel 1262 may be implemented, for example, to be flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11. Additionally or generally, the interface 1270 may include, for example, a mobile high definition link (MHL) interface, a SD card/multi-media card (MMC) interface, or an infrared data association (IrDA) standard interface.

The audio module 1280 may convert a sound and an electric signal in dual directions. At least a part of the audio module 1280 may be included, for example, in the input/output interface 1150 illustrated in FIG. 11. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 13:
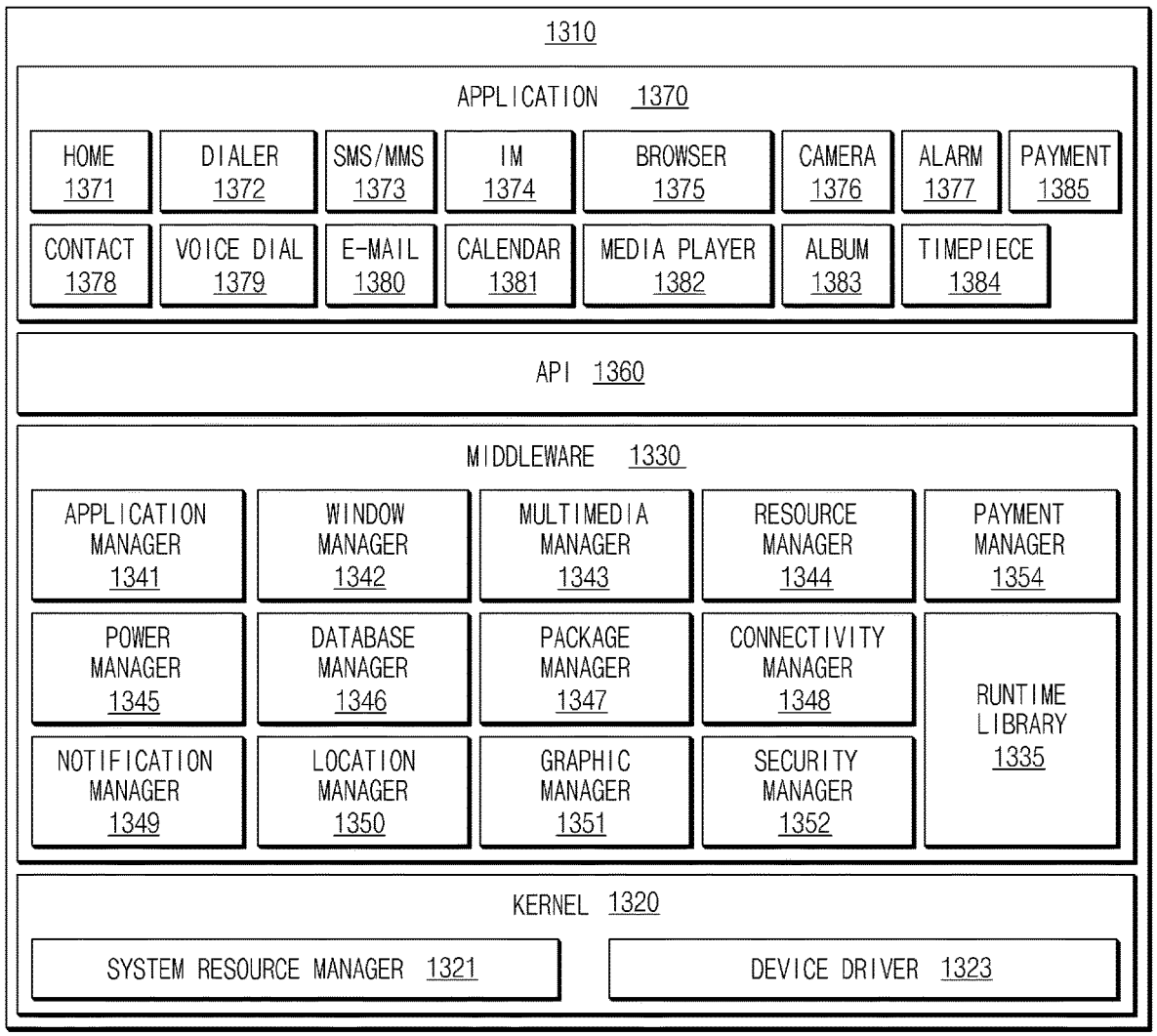
FIG. 13 is a block diagram of a program module according to various embodiments of the present disclosure.

FIG. 13 illustrates a block diagram of a program module, according to various embodiments.

According to an embodiment, a program module 1310 (e.g., the program 1140) may include an operating system (OS) to control resources associated with an electronic device (e.g., the electronic device 1101), and/or diverse applications (e.g., the application program 1147) driven on the OS. The OS may be, for example, Android, iOS, Windows, Symbian, or Tizen.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., the first electronic device 1102, the second electronic device 1104, the server 1106, or the like).

The kernel 1320 (e.g., the kernel 1141) may include, for example, a system resource manager 1321 or a device driver 1323. The system resource manager 1321 may control, allocate, or retrieve system resources. According to an embodiment, the system resource manager 1321 may include a process managing unit, a memory managing unit, a file system managing unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage capacity of a battery, temperature, or power, and may determine or provide power information for an operation of an electronic device by using the corresponding information from among the pieces of information. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, in the case where an electronic device (e.g., the electronic device 1101) includes a telephony function, the middleware 1330 may further include a telephony manager for managing a voice or video call function of the electronic device.

The middleware 1330 may include a middleware module that combines diverse functions of the above-described elements. The middleware 1330 may provide a module specialized to each OS kind to provide differentiated functions. Additionally, the middleware 1330 may dynamically remove a part of the preexisting elements or may add new elements thereto.

The API 1360 (e.g., the API 1145) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1370 (e.g., the application program 1147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a timepiece 1384, a payment 1385, health care (e.g., measuring an exercise quantity, blood sugar, or the like) or offering of environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 1101) and an external electronic device (e.g., the first electronic device 1102 or the second electronic device 1104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device. According to an embodiment, the application 1370 may include an application that is received from an external electronic device (e.g., the first electronic device 1102, the second electronic device 1104, or the server 1106). According to an embodiment, the application 1370 may include a preloaded application or a third party application that is downloadable from a server. The names of elements of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in computer-readable storage media in the form of a program module. The instruction, when executed by a processor (e.g., the processor 1120), may cause the one or more processors to perform a function corresponding to the instruction. The computer-readable storage media, for example, may be the memory 1130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing;
   a touch screen display located inside the housing and exposed through a first portion of the housing;
   a microphone located inside the housing and exposed through a second portion of the housing;
   at least one speaker located inside the housing and exposed through a third portion of the housing;
   a communication circuit located inside the housing;
   a processor located inside the housing and electrically connected with the touch screen display, the microphone, the at least one speaker, and the communication circuit; and
   a memory located inside the housing and electrically connected with the processor,
   wherein the memory is configured to store a first application program including a first user interface (UI) and a second application program including a second UI, and
   wherein, in response to executing an instruction stored in the memory, the processor is configured to:
      receive a user input through at least one of the touch screen display or the microphone, wherein the user input includes a request to perform a task by using the first application program and the second application program,
      transmit data relating to the user input to an external server via the communication circuit,
      receive a response from the external server via the communication circuit, wherein the response includes information about a sequence of statuses of the electronic device for performing the task, the information includes a plurality of status identifications (IDs) corresponding to respective statuses, and the plurality of status IDs include a first status ID, a second status ID, a third status ID, and a fourth status ID that differ from one another,
      in response to receiving the response from the external server, execute the first application program and display the first UI on the touch screen display based on the first status ID,
      in response to displaying the first UI, execute the second application program based on the second status ID,
      in response to executing the second application program, display the second UI on the touch screen display based on the third status ID and obtain at least one parameter to be used in the first UI, and
      in response to displaying the second UI, display the first UI on the touch screen display based on the fourth status ID and fill the first UI with the at least one parameter.

2. The electronic device of claim 1, wherein the first application program includes at least one of a message application program, an e-mail application program, or a web browser application program.

3. The electronic device of claim 2, wherein the second application program includes at least one of a contact application program, a gallery application program, a calendar application program, or a cloud service application program.

4. The electronic device of claim 1, wherein at least one of the plurality of status IDs includes at least a portion of a name of an application program.

5. The electronic device of claim 1, wherein at least one of the plurality of status IDs is not associated with a UI of an application program.

6. The electronic device of claim 1, wherein the response is generated by the external server based on the data relating to the user input.

7. The electronic device of claim 6,
wherein, in response to executing the instruction stored in the memory, the processor is further configured to transmit information of the electronic device to the external server via the communication circuit, and
wherein the response is generated by the external server based on the data relating to the user input and the information of the electronic device.

8. The electronic device of claim 7, wherein the information of the electronic device includes at least one of operating system (OS) information or application program information.

9. The electronic device of claim 1, wherein, in response to executing the instruction stored in the memory, the processor is further configured to:
generate a value in the second UI displayed on the touch screen display by using a parameter corresponding to the second status ID; and
obtain the value as a parameter to be used in the first UI.

10. The electronic device of claim 1,
wherein the second status ID includes a portion that specifies the third status ID, and
wherein, in response to executing the instruction stored in the memory, the processor is further configured to execute the second application program to execute an action corresponding to the portion that specifies the third status ID.

11. The electronic device of claim 1, wherein the plurality of status IDs included in the request correspond to statuses of the electronic device according to actions of the first and second application programs that perform the task.

12. A control method of an electronic device, the method comprising:
receiving, through at least one of a touch screen display or a microphone of the electronic device, a user input including a request to perform a task by using a first application program and a second application program;
transmitting data relating to the user input to an external server via a communication circuit of the electronic device;
receiving, from the external server via the communication circuit, a response including information about a sequence of statuses of the electronic device for performing the task;
in response to receiving the information about the sequence of statuses, executing the first application program and displaying a first user interface (UI) on the touch screen display based on a first status identification (ID) included in the information about the sequence of statuses;
in response to displaying the first UI, executing the second application program based on a second status ID included in the information about the sequence of statuses;
in response to executing the second application program, displaying a second UI of the second application program on the touch screen display based on a third status ID included in the information about the sequence of statuses and obtaining at least one parameter to be used in the first UI; and
in response to displaying the second UI, displaying the first UI on the touch screen display based on a fourth status ID included in the information about the sequence of statuses and filling the first UI with the at least one parameter.

13. The method of claim 12, wherein at least one of the first to fourth status IDs includes at least a portion of a name of an application program.

14. The method of claim 12, wherein at least one of the first to fourth status IDs is not associated with a UI of an application program.

15. The method of claim 12, wherein the response is generated by the external server based on the data relating to the user input.

16. The method of claim 15, further comprising:
transmitting information of the electronic device to the external server via the communication circuit,
wherein the response is generated by the external server based on the data relating to the user input and the information of the electronic device.

17. The method of claim 12, wherein the obtaining of the at least one parameter to be used in the first UI comprises:
generating a value in the second UI displayed on the touch screen display by using a parameter corresponding to the second status ID; and
obtaining the generated value as the parameter to be used in the first UI.

18. The method of claim 12,
wherein the second status ID includes a portion that specifies the third status ID, and
wherein the executing of the second application program based on the first status ID included in the information comprises executing the second application program to execute an action corresponding to the portion that specifies the third status ID.

19. The method of claim 12, wherein the first to fourth status IDs included in the request correspond to statuses of the electronic device according to actions of the first and second application programs that perform the task.

20. A server for processing a user input, the server being configured to:
receive data relating to the user input from an external electronic device, wherein the user input includes a request to perform a task by using a first application program and a second application program of the external electronic device;
generate text data based on the data relating to the user input;
determine an intent of the user input and a parameter corresponding to the intent based on the text data, the parameter being necessary for performing the task;
generate a response based on the intent and the parameter, the response including information about a sequence of statuses of the external electronic device for performing the task, the information including a plurality of status identifications (IDs) corresponding to respective statuses, and the plurality of status IDs include a first status ID, a second status ID, a third status ID, and a fourth status ID that differ from one another; and
transmit the response to the external electronic device.

* * * * *